US007584226B2

(12) United States Patent
Fatula, Jr. et al.

(10) Patent No.: US 7,584,226 B2
(45) Date of Patent: Sep. 1, 2009

(54) SYSTEM AND METHOD FOR PEER-TO-PEER GRID BASED AUTONOMIC AND PROBABILISTIC ON-DEMAND BACKUP AND RESTORE

(75) Inventors: Joseph J. Fatula, Jr., San Jose, CA (US); Colin Goldstein, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 11/135,876

(22) Filed: May 24, 2005

(65) Prior Publication Data

US 2006/0271601 A1    Nov. 30, 2006

(51) Int. Cl.
*G06F 12/00*    (2006.01)
(52) U.S. Cl. ....................... 707/204; 707/205
(58) Field of Classification Search ............... 707/204, 707/202
See application file for complete search history.

(56) References Cited

U.S. PATENT DOCUMENTS

| | | | |
|---|---|---|---|
| 6,505,216 B1 | 1/2003 | Schutzman et al. | |
| 6,523,036 B1* | 2/2003 | Hickman et al. | 707/10 |
| 6,615,253 B1* | 9/2003 | Bowman-Amuah | 709/219 |
| 6,631,478 B1* | 10/2003 | Wang et al. | 714/15 |
| 6,640,244 B1* | 10/2003 | Bowman-Amuah | 709/207 |
| 6,675,177 B1* | 1/2004 | Webb | 707/200 |
| 6,711,594 B2 | 3/2004 | Yano et al. | |
| 6,785,786 B1* | 8/2004 | Gold et al. | 711/162 |
| 2002/0116474 A1* | 8/2002 | Copeland et al. | 709/219 |
| 2003/0120593 A1* | 6/2003 | Bansal et al. | 705/39 |
| 2003/0126247 A1 | 7/2003 | Strasser et al. | |
| 2003/0154284 A1* | 8/2003 | Bernardin et al. | 709/226 |
| 2003/0187853 A1* | 10/2003 | Hensley et al. | 707/10 |
| 2004/0054700 A1* | 3/2004 | Okada | 707/204 |
| 2004/0068729 A1* | 4/2004 | Simon et al. | 718/102 |
| 2004/0083245 A1* | 4/2004 | Beeler, Jr. | 707/204 |
| 2005/0044228 A1* | 2/2005 | Birkestrand et al. | 709/226 |
| 2005/0188165 A1* | 8/2005 | Wolfgang et al. | 711/162 |
| 2005/0192968 A1* | 9/2005 | Beretich et al. | 707/10 |

(Continued)

OTHER PUBLICATIONS

U.S. Appl. No. 10/736,413, filed Dec. 15, 2003, Joseph J. Fatula, Jr., Apparatus, System, And Method For Grid Based Data Storage.

(Continued)

*Primary Examiner*—John R. Cottingham
*Assistant Examiner*—Mohammed R Uddin
(74) *Attorney, Agent, or Firm*—Silvy Anna Murphy; Arthur J. Samodovitz

(57) ABSTRACT

A system and method for peer-to-peer grid based autonomic and probabilistic on-demand trackless backup and restore are disclosed. The on-demand trackless backup-restore system includes a plurality of nodes connected to a network communications channel. The plurality of nodes in the on-demand trackless backup-restore system includes at least one node that is a source client configured to initiate a trackless data backup-restore request and includes one or more nodes that are target clients configured to perform the trackless data backup-restore request. Further, the source client in the on-demand trackless backup-restore system is configured to establish direct connections with one or more of the target clients that are available to perform the trackless data backup-restore request.

22 Claims, 19 Drawing Sheets

U.S. PATENT DOCUMENTS

| | | | |
|---|---|---|---|
| 2005/0197866 A1* | 9/2005 | Salcedo et al. | 705/4 |
| 2006/0010174 A1* | 1/2006 | Nguyen et al. | 707/202 |
| 2006/0053177 A1* | 3/2006 | Suomela et al. | 707/204 |
| 2006/0056386 A1* | 3/2006 | Stogel | 370/351 |
| 2006/0165040 A1* | 7/2006 | Rathod et al. | 370/335 |
| 2006/0179061 A1* | 8/2006 | D'Souza et al. | 707/10 |
| 2006/0265402 A1* | 11/2006 | Edmond et al. | 707/10 |
| 2006/0271601 A1* | 11/2006 | Fatula et al. | 707/201 |
| 2006/0294210 A1* | 12/2006 | Falchuk | 709/220 |
| 2007/0050340 A1* | 3/2007 | von Kaenel et al. | 707/3 |
| 2007/0106892 A1* | 5/2007 | Engberg | 713/168 |
| 2007/0112574 A1* | 5/2007 | Greene | 705/1 |
| 2007/0198614 A1* | 8/2007 | Zhang et al. | 707/205 |

OTHER PUBLICATIONS

U.S. Appl. No. 10/736,473, filed Dec. 15, 2003, Joseph J. Fatula, Jr., Apparatus, System, And Method For On-Demand Control of Grid System Resources.

U.S. Appl. No. 10/736,938, filed Dec. 15, 2003, Joseph J. Fatula, Jr., Apparatus, System, And Method For Autonomic Control of Grid System Resources.

* cited by examiner

FIG. 6

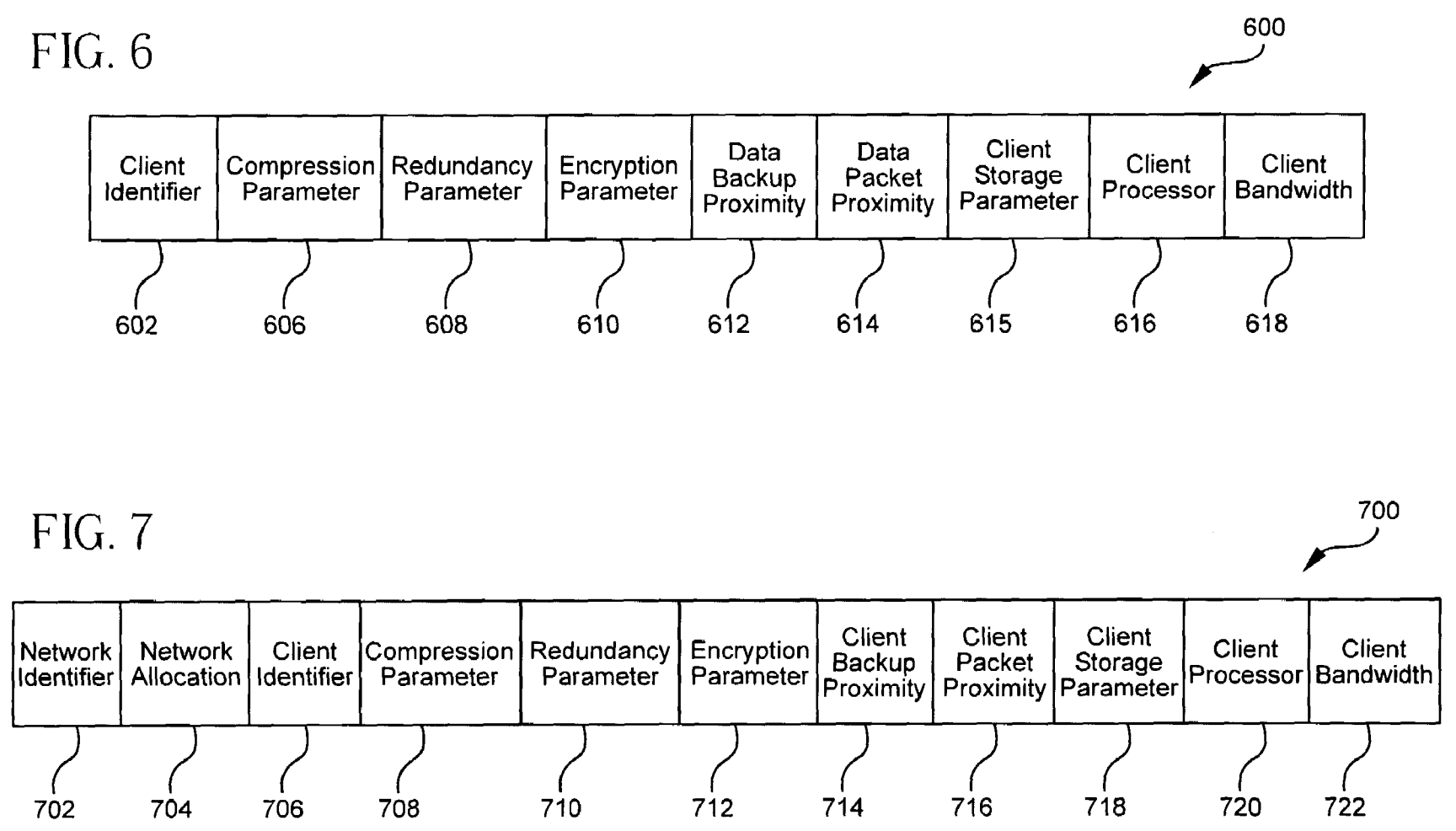

| Client Identifier | Compression Parameter | Redundancy Parameter | Encryption Parameter | Data Backup Proximity | Data Packet Proximity | Client Storage Parameter | Client Processor | Client Bandwidth |
|---|---|---|---|---|---|---|---|---|
| 602 | 606 | 608 | 610 | 612 | 614 | 615 | 616 | 618 |

| Network Identifier | Network Allocation | Client Identifier | Compression Parameter | Redundancy Parameter | Encryption Parameter | Client Backup Proximity | Client Packet Proximity | Client Storage Parameter | Client Processor | Client Bandwidth |
|---|---|---|---|---|---|---|---|---|---|---|
| 702 | 704 | 706 | 708 | 710 | 712 | 714 | 716 | 718 | 720 | 722 |

700

SYSTEM AND METHOD FOR PEER-TO-PEER GRID BASED AUTONOMIC AND PROBABILISTIC ON-DEMAND BACKUP AND RESTORE

FIELD OF THE INVENTION

The present invention relates to system and method of backing up and restoring data in a grid computing system and more particularly, the invention relates to an on demand system and method for backing up and restoring data in a peer-to-peer grid based autonomic computing system where a probability of restoring data has been predetermined by a client.

BACKGROUND OF THE INVENTION

Many current grid computing systems are designed to allow multiple interconnected computers, or nodes or clients, to work together on large grid applications, such as computational problems, that would be impossible to do on a single machine. This type of shared processing of grid applications is possible in part because of the enforced or incidental idle processor time of many personal and business computers. In order to feasibly manage such overwhelming amounts of computational processing, a computational problem may be divided into several smaller, more manageable jobs, which is then distributed or scattered among the various computers throughout one or more grid computing systems for processing. As such, grid computing systems may allow for shared storage across a plurality of nodes within the system. In this way, data may be stored remotely on the system, in the form of a backup, for example, and allow large amounts of data to be virtually stored by a single node. With various disparate storage, memory, and processing resources available from the many nodes in a grid computing system, it has become imperative that such grid systems are designed so that the sharing of storage, memory, and processing resources utilized for backing up and restoring of data in a grid computing system is conducted in an organized and efficient manner that is not cost-prohibitive nor requires the implementation of a central controller that maintains critical information regarding distributed data in the grid computing system. Further, there is a need for such grid computing systems to be autonomic and to take into account the dynamic nature of grid computing, in which many resources may be dynamically allocated, reclaimed, reserved and or not available. Furthermore, there is a need for dramatically reducing costs of such backup and restore when restoration of 100% of the data is not critical.

SUMMARY OF THE INVENTION

In a first aspect of the invention, there is provided an on-demand data backup-restore system for backing up and restoring data in a grid computing system. The system comprises a network communications channel and a plurality of client nodes that are connected to the network communications channel, where at least one of the plurality of client nodes is a source client configured to initiate a data backup-restore request, and where a plurality of the client nodes are target clients configured to perform the data backup-restore request and at least one of the plurality of client nodes is a super node configured to broker an initial communication between the source client and the target clients. Preferably, the super node provides the source client with a list of available target clients that the source client can contact for performing the data backup-restore request. Alternatively, the system comprises a super node list provider for supplying a super node list that includes at least one super node configured to broker the initial communication. The system further comprises a subscription manager configured to manage a contractual subscription for each of the plurality of client nodes. Preferably, the super node comprises a communication component that includes a data backup request module, a data retrieval request module, a data restore request module and a list generation module. Preferably, each of the plurality of client nodes in the system further comprises a global client profile, a local client profile, a data assembly record and a log. More preferably, each of the plurality of client nodes further comprises an on-demand data backup-restore component that includes a communication module, a profile management module, a list generation module, a data storage module, a data retrieval module, a data restoration module, a data assembly module, a data compression module, a data encryption module, a data redundancy module and a unique file identifier generation module. In a preferred embodiment, the data backup-restore request comprises one of: backing up a data file, backing up one or more of a plurality of data file fragments, restoring a data file, retrieving a data file, retrieving one or more of a plurality of data file fragments, restoring one or more of a plurality of data file fragments and restoring a client that has experienced a loss of data.

In another embodiment of the invention, there is provided a method for trackless backup and restoration of data across a cluster of client nodes. The method comprises providing the cluster of client nodes connected to a network communications channel, the cluster of client nodes including a source client configured to initiate a trackless data backup-restore request for one or more data files and a plurality of target clients configured to perform the trackless data backup-restore request for one or more data files, seeking available target clients from the plurality of target clients for performing the trackless data backup-restore request, establishing connections with a subset of the available target clients and directing the trackless data backup-restore request by employing the subset of the available target clients without tracking a location of the data. Preferably, the providing step further comprises providing the cluster of client nodes that includes at least one super node configured to broker an initial communication regarding the trackless data backup-restore request between the source client and the plurality of target clients and, preferably, the seeking step further comprises the super node communicating the trackless data backup-restore request from the source client to the plurality of target clients and the super node receiving communication from the available target clients and the super node supplying the source client with a list of the available target clients. Further, the establishing step comprises transmitting the trackless data backup-restore request and receiving a response from the available target clients. Preferably, the trackless data backup-restore request comprises one of: backing up a data file, backing up one or more of a plurality of data file fragments, restoring a data file, retrieving a data file, retrieving one or more of a plurality of data file fragments, restoring one or more of a plurality of data file fragments and restoring a client that has experienced a loss of data.

In an embodiment, where the trackless data backup-restore request is for backing up one or more data files, the directing step further comprises selecting one or more data files to be backed up, computing a unique file identifier for each of the data files, adding redundancy to one or more data files selected based on a plurality of profile settings, fragmenting into a plurality of data file fragments each of the selected data files to which redundancy has been added, encrypting each of the plurality of data file fragments, sending each of the plurality of data file fragments to be backed up to the subset of available target clients without tracking any location of where the data is sent and severing connections with the subset of the available target clients. Further, if the trackless data backup-restore request is for restoring one or more data files, the directing step further comprises establishing a predefined restoration level to restore one or more data files, selecting one or more data files to be restored, transmitting the trackless data backup-restore request to the plurality of target clients along with a unique file identifier corresponding to each of the data files to be restored, receiving communication from the available target clients that possess one or more data file fragments corresponding to the unique file identifier corresponding to each of the data files, retrieving one or more data file fragments from the subset of the available target clients, assembling one or more data file fragments retrieved from the subset of the available clients to restore one or more data files and severing connections with the subset of the available target clients. The method further comprises determining whether a sufficient number of one or more data file fragments have been retrieved to restore each of the data files selected to the predefined restoration level and if the sufficient number of the data file fragments have not been retrieved, initiating another data backup-restore request for acquiring additional data file fragments to restore each of the data files selected to the predefined restoration level.

In an embodiment, where the trackless data backup-restore request is for recreating a client that has experienced a loss of data, the directing step further comprises establishing a predefined restoration level to restore the client, recovering the client to an initial base state, restoring a unique identifier list file containing a list of all of a plurality of unique file identifiers corresponding to all of a plurality of data files that the client had backed up prior to the loss of data and employing the unique identifier list file to restore all of the plurality of data files that the client had backed up prior to the loss of data. Preferably, the employing step further comprises transmitting the trackless data backup-restore request to the plurality of target clients along with each of the plurality of unique file identifiers corresponding to the plurality of data files to be restored, receiving communication from the available target clients that possess one or more data file fragments corresponding to each of the plurality of unique file identifiers transmitted to restore the plurality of data files that the client had backed up prior to the loss of data, retrieving one or more data file fragments corresponding to each of the plurality of unique file identifiers, assembling each of the plurality of data files from one or more data file fragments retrieved from the subset of the available clients and severing connections with the subset of the available target clients.

In yet another aspect of the invention, there is provided a method of providing a trackless data backup-restoration service for backing up and restoring data across a plurality of clients in a grid computing system. The method comprises providing the plurality of clients including a source client configured to initiate a trackless data backup-restore request and a plurality of target clients configured to perform the trackless data backup-restore request. Preferably, the providing step includes providing a subscription manager for registering the plurality of clients with the trackless data backup-restoration service. The method further comprises supplying a trackless data backup-restore software to the plurality of clients, the trackless data backup-restore software including a super node list containing at least one super node configured to broker the trackless data backup-restore request from the source client to the plurality of target clients, communicating the trackless data backup-restore request from the source client to a super node on the super node list, transmitting, by the super node, the data backup-restore request from the source client to the plurality of target clients and the super node forwarding to the source client a list of available target clients that the source client can directly contact for performing the trackless data backup-restore request without the source client tracking any location of the data.

In yet another embodiment of the invention, there is provided a programmable media containing programmable software to backup-restore data across a plurality of clients in a grid computing network. The programmable software comprises providing the plurality of clients including a source client configured to initiate a trackless data backup-restore request and a plurality of target clients configured to perform the trackless data backup-restore request, communicating the trackless data backup-restore request from the source client to the plurality of target clients, establishing connections with a subset of available target clients that respond to the trackless data backup-restore request communicated and executing the trackless backup-restore request without tracking any location of the data. Preferably, the communicating step further comprises providing a super node list that includes at least one super node configured to broker the trackless data backup-restore request from the source client to the plurality of target clients, such that the super node communicates the trackless data backup-restore request from the source client to the plurality of target clients and provides the source client with a list of the available target clients that responded to the trackless data backup-restore request communicated. Preferably, the establishing step further comprises establishing, by the source client, direct connections with the subset of the available target clients that responded to the trackless data backup-restore request communicated for execution of the trackless data backup-restore request. In a preferred embodiment, the trackless data backup-restore request comprises one of: backing up a data file, backing up one or more of a plurality of data file fragments, restoring a data file, retrieving a data file, retrieving one or more of a plurality of data file fragments, restoring one or more of a plurality of data file fragments and restoring a client that has experienced a loss of data.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 is a block diagram depicting a local client profile setting stored on a client for backing up and restoring data in a peer-to-peer grid based system, in accordance with an embodiment of the present invention.

FIG. 7 is a block diagram depicting a global client profile setting stored on a client for backing up and restoring data in a peer-to-peer grid based system, in accordance with an embodiment of the present invention.

BEST MODE FOR CARRYING OUT THE INVENTION

Figure 1:
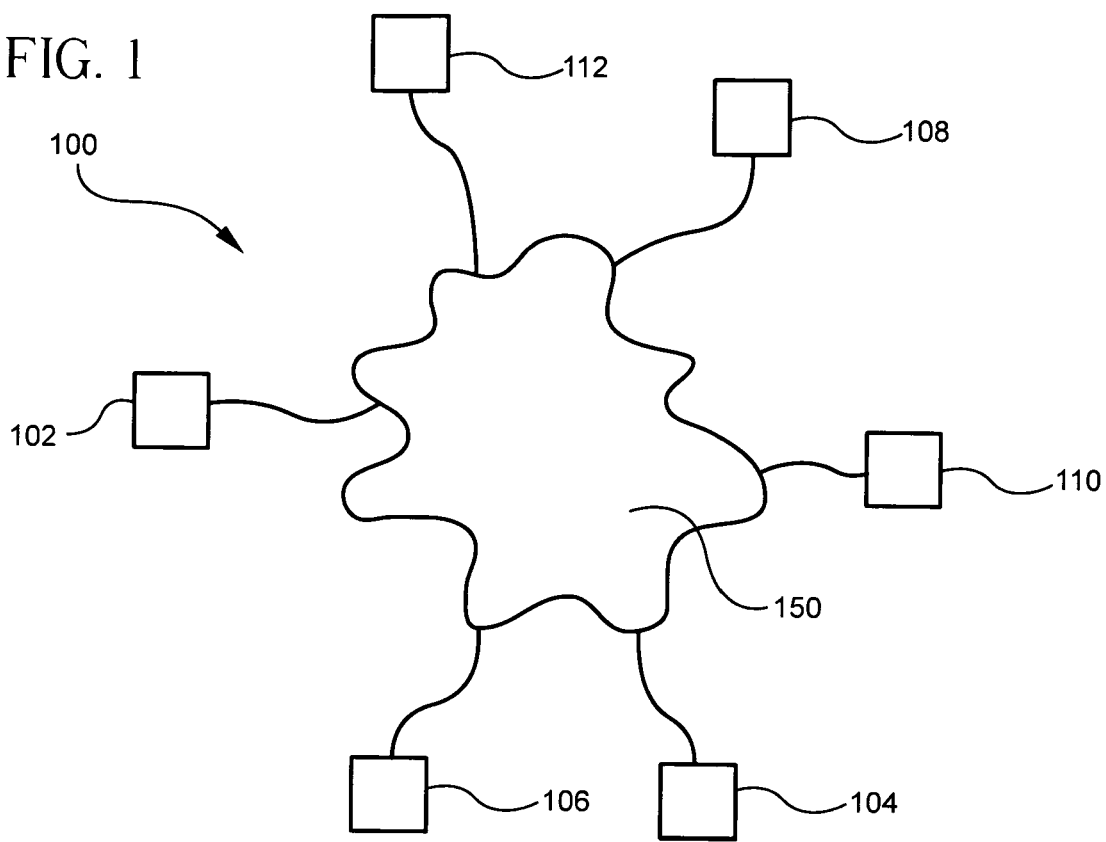
FIG. 1 represents a peer-to-peer grid system that includes a super node and a plurality of clients connected via a network communications channel, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides an on-demand data backup-restore system for backing up and restoring data in a grid computing system. In particular, the invention provides a trackless on-demand backup-restore system for backing up and restoring data in a peer-to-peer grid computing system. The system comprises a network communications channel and a plurality of client nodes that are connected to the network communications channel, where at least one of the plurality of client nodes is a source client configured to initiate a data backup-restore request, where a plurality of the client nodes are target clients configured to perform the data backup-restore request and at least one of the plurality of client nodes is a super node configured to broker an initial communication between the source client and the target clients. Preferably, the super node provides the source client with a list of available target clients that the source client can contact for performing the data backup-restore request. Alternatively, the system comprises a super node list provider for supplying a super node list that includes at least one super node configured to broker the initial communication. The system further comprises a subscription manager configured to manage a contractual subscription for each of the plurality of client nodes. Preferably, the super node comprises a communication component that includes a data backup request module, a data retrieval request module, a data restore request module and a list generation module. Preferably, each of the plurality of client nodes in the system further comprises a global client profile, a local client profile, a data assembly record and a log. More preferably, each of the plurality of client nodes further comprises an on-demand data backup-restore component that includes a communication module, a profile management module, a list generation module, a data storage module, a data retrieval module, a data restoration module, a data assembly module, a data compression module, a data encryption module, a data redundancy module and a unique file identifier generation module. In a preferred embodiment, the data backup-restore request comprises one of: backing up one or more data files, backing up one or more of a plurality of data file fragments, restoring one or more data files, retrieving one or more data files, retrieving one or more of a plurality of data file fragments, restoring one or more of a plurality of data files and restoring a client that has experienced a loss of data.

As used herein, the term "on-demand" is intended to comprise a computing environment where the demand is variable. "On-demand" means to make changes in a backup or restore process when the need arises as opposed to trying to anticipate backup and restore needs using some sort of a forecast. Responding on demand does not require a forecast, but it does require the capability or ability to make changes rapidly in the backup or restore process, as needed. Further, as used herein, the term "data" is used to refer to either a data file or a data file fragment. The term "data file" is intended to define either an original data file or an original piece of data that has not been fragmented, whereas, the term "data file fragment" is intended to define a portion or piece of data file that has been fragmented. Also, as used herein, the term "trackless" is intended to refer to the fact that the location of the data is not tracked as to which client has what data files or data file fragments. In particular, the source client does not know the location of where data is sent for storage. Similarly, a target client does not track whose data is being stored thereon other than the implied knowledge contained in a unique file identifier (UFID) associated with the data. The term "unique file identifier (UFID)" as used herein is any unique identifier or name used for a data file or data file fragment that is sufficient to identify that data file or data file fragment as being unique. Furthermore, the term "backup" or "backing up" is intended to include storing either a data file or a data file fragment. The term "retrieve" or "retrieval" is intended to mean retrieving or obtaining a data file or a data file fragment, whereas, the term "restore" or "restoration" is intended to include retrieving or obtaining one or more data files or one or more data file fragment and assembling the data files or data file fragments to construct or restore the original file that was scattered for storage. Additionally, the term "data backup-restore" is used to refer to the process for either backing up data or restoring data. Moreover, as used herein, the term "recreate" is intended to refer to the rebuilding of a client that has experienced a partial or total loss of data. In particular, the term "data backup-restore request" generally refers to either a request from a client for data backup or a request from a client seeking to restore data that has been previously stored. Preferably, the term "data backup-restore request" may include one or more of the following: backing up a data file, backing up one or more data file fragments, retrieving a data file, retrieving one or more data file fragments, restoring one or more data files and recreating a client that has experienced a loss of data. Finally, the term "predefined restoration level" refers to a predetermined probability level set by a client for restoring data. Preferably, the predefined restoration level is less than 100% in that the client does not expect to restore 100% of the data at all times.

Reference is now made to FIGS. 1 through 7, which illustrate various embodiments and aspect of a grid computing system, in accordance with the invention. Referring to FIG. 1, FIG. 1 depicts a peer-to-peer grid computing system 100 that includes a plurality of client-servers or nodes 102, 104, 106, 108, 110 and 112 that are connected via a network communications channel 150. In one embodiment, the peer-to-peer grid based system 100 comprises a network communications channel 150, where the plurality of client nodes or peer nodes 102-112 are connected to the network communications channel 150 and are configured to execute a grid application. A grid application is a collection of work items that together achieve a specified objective. For example, a grid application may determine very complex mathematical calculations, including weather forecasting, stock market development, and so forth. A grid application also may process large-scale multimedia operations. In another embodiment, a grid application may perform data backup operations on large and diverse amounts of data. Although the present invention may apply to myriad other grid applications and functions, the following description will focus on data backup operations within a grid computing environment. A grid application may be divided into jobs, or single units of work. The several jobs of a grid application may be executed concurrently, serially, or co-dependently on one or more of the various nodes 102, 104, 106, 108, 110, and 112. Each of the nodes 102-112 may allocate certain performance, storage or memory resources to the grid system 100 for execution of grid applications. These resources made available by the clients 102-112 may include processor capability, processor capacity, storage capacity, and other similar resources. In one embodiment, a client 102 112 may dedicate a specific amount of total processor capability, storage capacity, or memory capacity to the grid system 100 for execution of grid applications.

Each client 102-112 in FIG. 1 may act as either a source client or a target client, depending on the role of the client 102-112 in a particular grid application. For example, where the client 102 initiates a data backup-restore grid application, the client 102 acts as a source client. Alternately, where one or more of the clients 104-112 makes local storage resources available for execution of a remotely initiated data backup-restore grid application, each of the clients 104-112 acts as a target client. For example, in the case of a grid backup-restore operation, a source client 102 may have backup data files on one or more target clients 104-112, where the target clients 104-112 allocate some available storage to the peer-to-peer grid based system 100 for such backup-restore grid applications. Moreover, where the client 102 initiates a data backup-restore request for restoring data, the client is referred to as the source client that initiates the backup-restore request and the clients that respond to the source client's request are referred to as the target clients. However, when retrieving the data, the target clients are in fact the source of the stored data, whereas, the source client asking for the stored data is in fact the target the data is being sent to.

Figure 2:
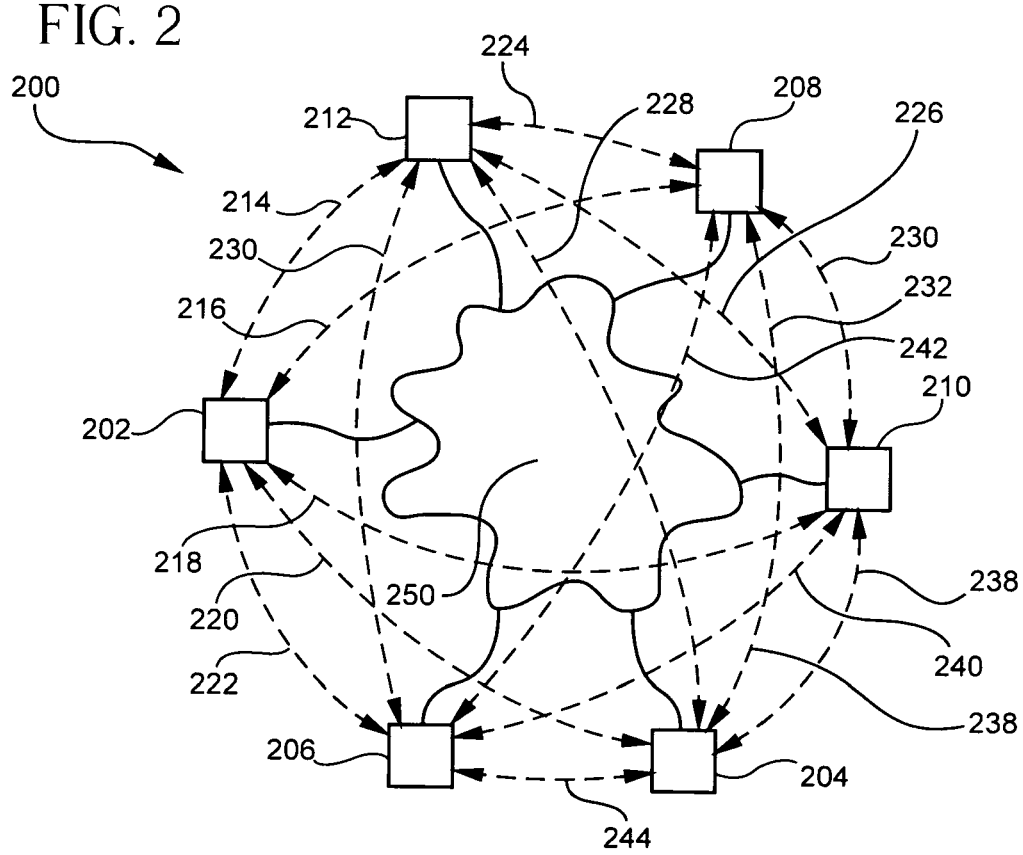
FIG. 2 represents a peer-to-peer grid system that includes a plurality of clients connected via a network communications channel and depicts the possible communication pathways between the plurality of clients, in accordance with an embodiment of the present invention.

FIG. 2 shows the various communication pathways of a peer-to-peer grid computing system 200, where the client-servers 202, 204, 206, 208, 210 and 212 of the grid computing system 200 are capable of communicating directly with each other since each is connected to the others via a network communications channel 250. For instance, client 202 is able to communicate with each of the other clients 204, 206, 208, 210 and 212 as depicted by the double-sided dotted arrows 220, 222, 216, 218 and 214, respectively. Similarly, the other double-sided dotted arrows show communication paths with other clients in the grid computing system 200. The illustrated grid systems 100 and 200 are similar to a local area network (LAN) or wide area network (WAN), and the communications channels 150 and 250 may be, in one embodiment, an Ethernet communications channel, a wireless communications channel, or another equivalent communications channel. Likewise, the communications channels 150 and 250 may comprise a combination of various types of communications channels. Although the depicted grid computing systems 100 and 200 are shown to comprise of six client-servers 102-112 and 202-212, respectively, the grid computing systems 100 and 200 may comprise a combination of various network configurations having fewer or more client-servers, or alternate client-server configurations.

Figure 3A:
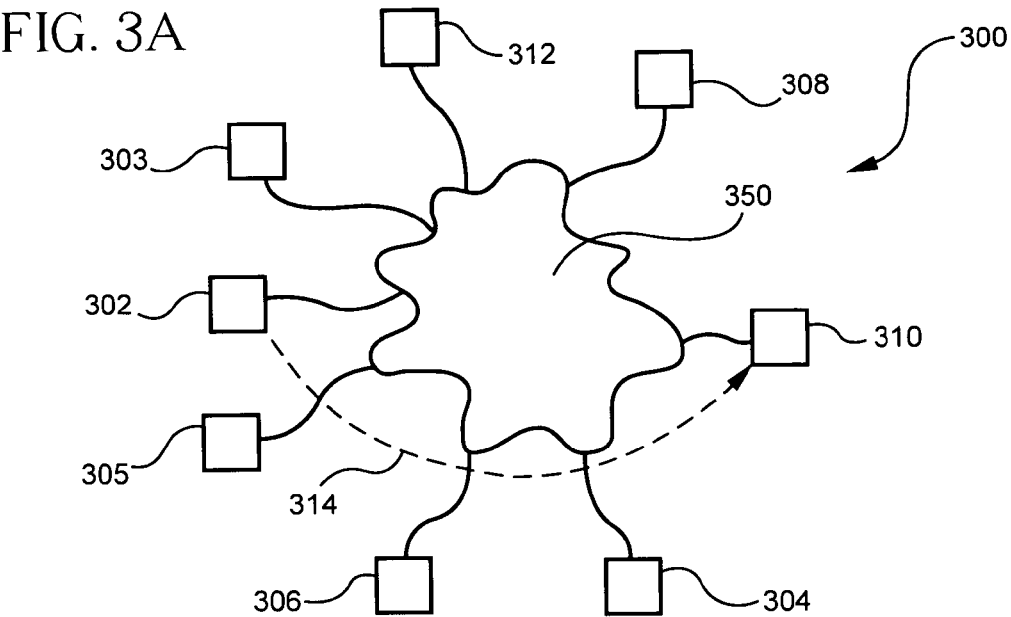
FIG. 3A depicts a client communicating a backup-restore request to a super node in a peer-to-peer grid based system, in accordance with an embodiment of the present invention.
Figure 3B:
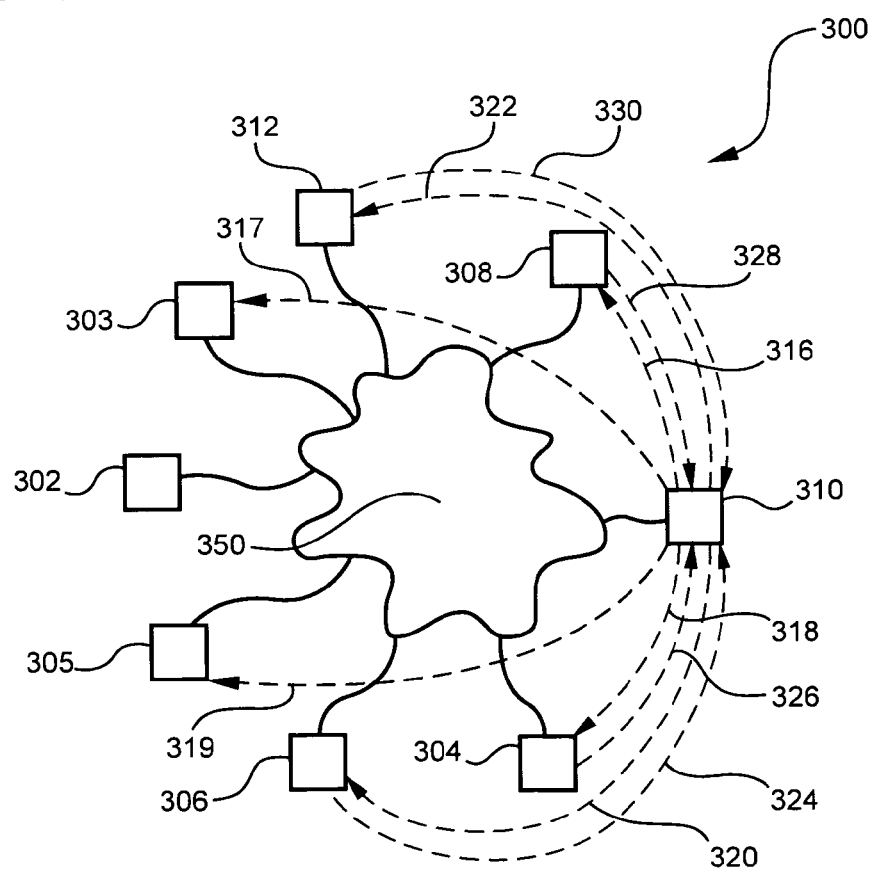
FIG. 3B depicts a super node communicating a backup-restore request received from a client to a plurality of target clients and the plurality of target clients responding back to the super node in a peer-to-peer grid based system, in accordance with an embodiment of the present invention.
Figure 3C:
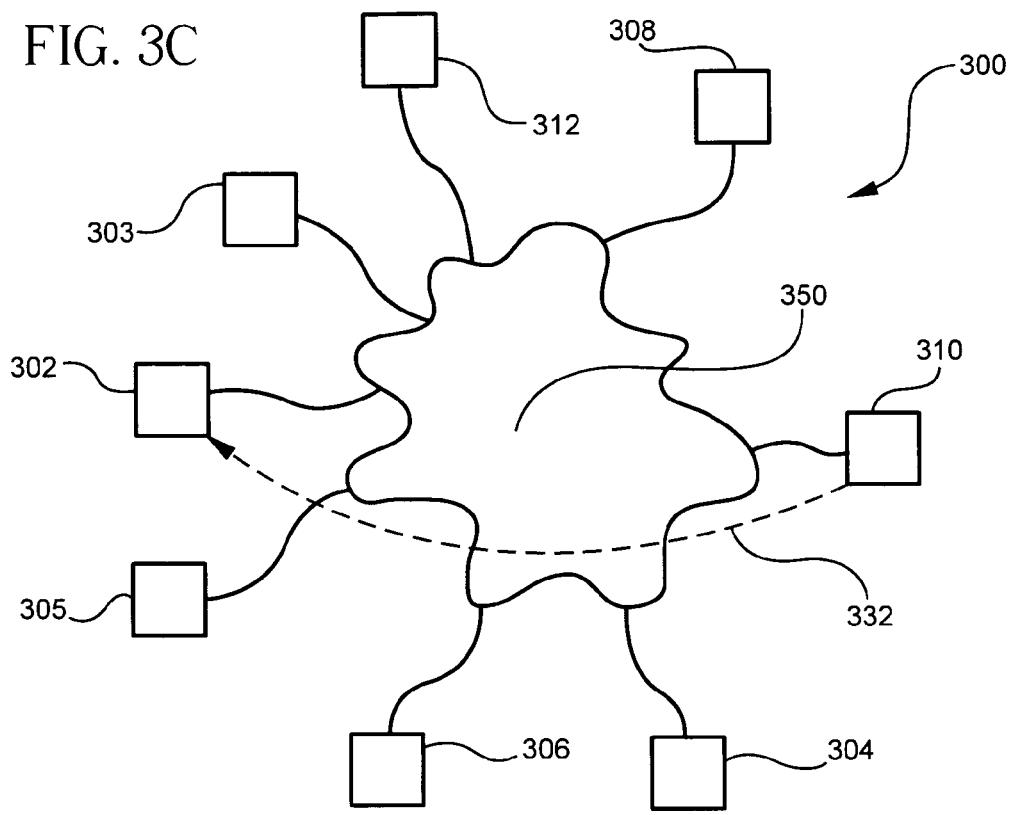
FIG. 3C depicts a super node communicating with a client to provide the client with a list of available target clients in a peer-to-peer grid based system, in accordance with an embodiment of the present invention.
Figure 3D:
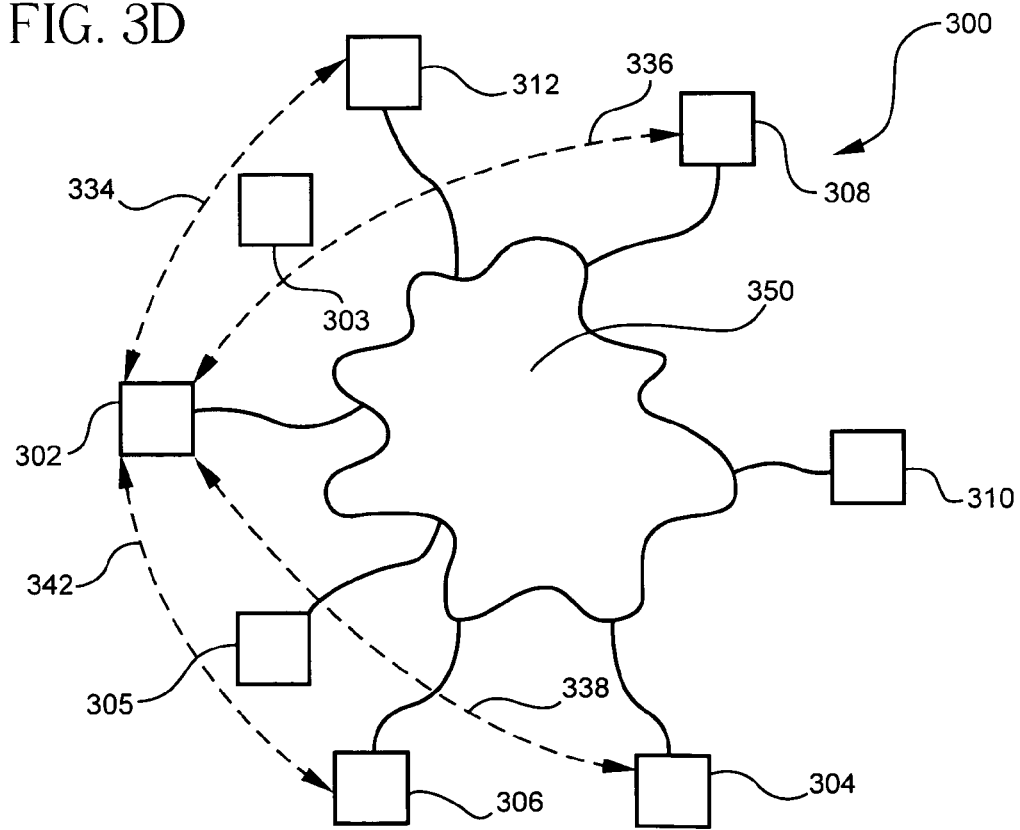
FIG. 3D depicts a client establishing direct communications with a subset of available target clients in a peer-to-peer grid based system, in accordance with an embodiment of the present invention.

FIGS. 3A-3D show another embodiment of a grid computing system. Each of FIGS. 3A-3D show a grid computing system 300 that includes a source client 302, a plurality of target clients 303, 304, 305, 306, 308 and 312 and preferably, a super node 310. The source client 302 is the client that is configured to initiate a backup-restore request and the target clients 303, 304, 305, 306 308 and 312 are each configured to perform or carry out the backup-restore request for the source client 302. Preferably, the super node 310 is configured to broker an initial communication regarding the backup-restore request between the source client 302 and each of the target clients 303, 304, 305, 306 308 and 312. In particular, as shown in FIG. 3A, the source client 302 communicates a data backup-restore request (shown by dotted arrow 314) to super node 310, requesting a list of target clients which either have space available to store at least one data file or data file fragment or has a data file or data file fragment having a specific unique file identifier (UFID) corresponding to a data file to be restored. As shown in FIG. 3B, the super node 310 communicates the request to each of the target clients 303 (shown by the dotted request arrow 317), 304 (shown by dotted arrow 318), 305 (shown by the dotted arrow 319), 306 (shown by dotted request arrow 320), 308 (shown by the dotted request arrow 316), 312 (shown by the dotted request arrow 322). Any target client that is available and meets the criteria set forth in the backup-restore request responds to the super node 310, as shown in FIG. 3B. For instance, each of the available target clients 304 (shown by the response arrow 326), 306 (shown by the response arrow 324), 308 (shown by the response arrow 328), and 312 (shown by the response arrow 330) respond to the super node 310. However, target clients 303 and 305 who receive the request do not respond back to the super node 310 for any number of reasons, such as, they may not be available to respond, they may not have space or memory available for storage, they may not have the data file or they may not have a fragment for the particular UFID. The super node 310 then communicates (as shown by the arrow 332 in FIG. 3C) with the source client 302 and provides the source client 302 with a list. Preferably, the list provided to the source client 302 is a URL (Uniform Resource Locator) list containing a list of the available target clients 304, 306, 308 and 312 (not 303 and 305 who did not respond to the super node 310) that responded as being available to perform the backup-restore request, so that the source client 302 can establish a peer-to-peer type connection directly with the available target clients 304, 306, 308 and 312 that responded to the backup-restore request, as shown in FIG. 3D.

Preferably, the super node 310 performs a different function (communicating backup-restore requests) than the client nodes 302, 303, 304, 305, 306, 308 and 312 (performing data backup-restore). However, the super node 310 can also be a client for backing up or restoring its own files. Preferably, the super node 310 has no long term persistent data, but rather simply provides a service where the source client 302 can contact it with a request, the super node 310 communicates the request to the target clients either by a broadcast or when a target client communicates to it signaling that it is available. Thus, the super node's ability to communicate a data request does not require long term memory or storage, but preferably, only memory or storage sufficient to be able to communicate the data request, that is, short term memory, for example, storage for seconds, minutes or tens of minutes, but not for long periods of time.

One communication mechanism that can be employed by the super node 310 is called broadcasting, where the super node 310 broadcasts a message to one or more of the target clients. A broadcast implies that there are listeners (target clients) on the network listening for a communication and once received, the listeners can choose whether or not to take appropriate actions with respect to the broadcasted communication. An alternative communication mechanism that can be used by the super node 310 is brokering, where the super node 310 acts as a broker and communicates the backup-restore request to any target client that it comes in communication with. One implementation of brokering that can be performed is that the super node exchanges a backup-restore request from a source client with any target client that contacts the super node. Alternately, when a target client becomes available for work (has computing cycles available), it can contact a super node to state that it is available for work and the super node keeps the contact information for the target client. So when a source client contacts the super node with a data backup-restore request, the super node can exchange the kept target client contact information regarding available target clients with the source client, therefore, eliminating the need for a broadcast. In this mode, after the target client contacts the super node, the super node then provides the source client with a list of target clients available to carry out the backup-restore request, so that peer-to-peer communication (direct communication) between the source client and one or more of the target clients can occur. In this embodiment, the exchange of information between the clients becomes peer to peer after the super node brokers the connection. In general, the source client preferably establishes many simultaneous sessions with target clients depending on limitations of the network, operating system, etc. This allows as much parallelism as possible to minimize the time for backup or restore traffic to occur. Moreover, the source client can send a single data file fragment to a target client and then pick another target client. In other implementations, the source client could send many data file fragments to a target client. The second case would be preferential where the target clients are fixed in location on the network, have higher reliability, etc. Alternatively, instead of the grid computing system 300 comprising a super node 310, the grid computing system 300 can comprise a super node list provider (not shown in any of the drawings) for supplying a list of super nodes that includes at least one super node configured to broker the initial communication regarding the backup-restore request. For instance, the super node list provider could provide a super node list on a CD (Compact Disc), via a web page, etc. Further yet, the grid computing system 300 (shown in FIG. 3A) can comprise of all peer clients 302, 303, 304, 305, 306, 308, 310 and 312, where client 310 is not a super node, but just another peer client. For instance, the client 302 can act as a source client and can initiate a data backup-restore request by contacting each of the other peer clients 303, 304, 305, 306, 308, 310 and/or 312 directly and where one or more of the peer clients 303, 304, 305, 306, 308, 310 and/or 312 can respond directly to client 302. Alternatively, the grid computing system 300 can comprise of peer clients 302, 304, 305, 306, 308 and 312, where 310 is a super node and where the grid computing system 300, preferably, also include a subscription manager 303 that is configured to manage a contractual subscription for each of the clients 302, 304, 305, 306, 308 and 312. Alternatively, in a preferred embodiment, the super node is a collection of super nodes, which may exchange lists of target clients among themselves to facilitate a higher probability of response. The super nodes preferably have the ability to talk to each other and, thus, can update the source client's super node list appropriately, for instance, each time the source client talks to the super node.

Figure 4:
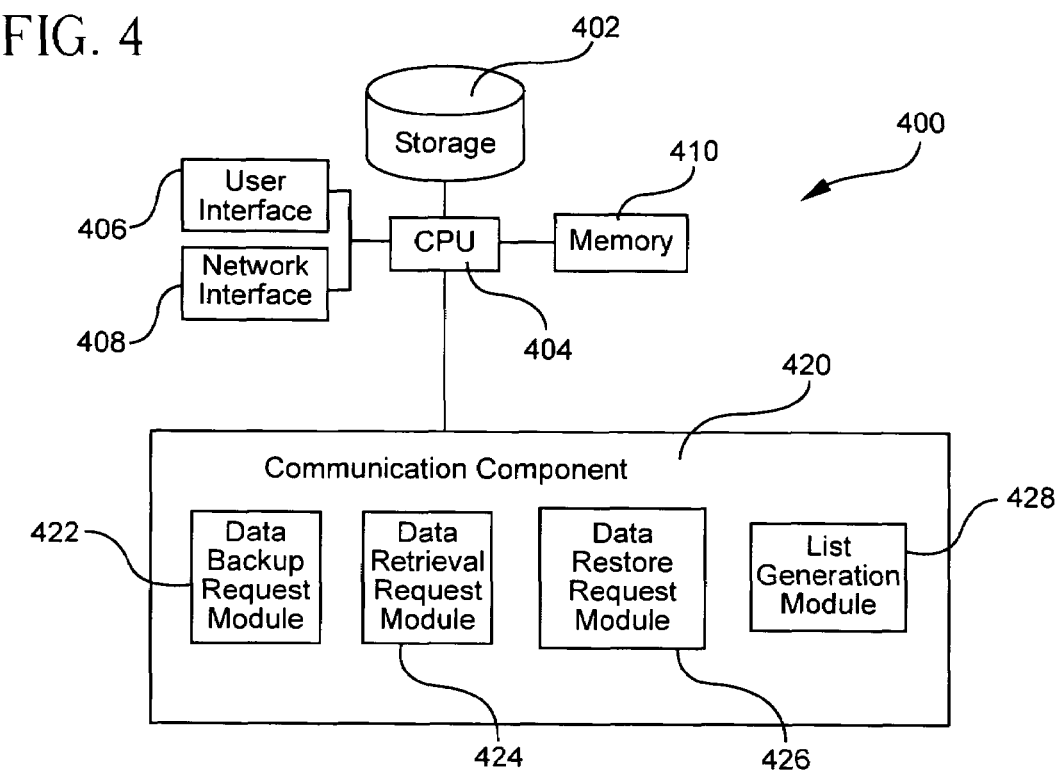
FIG. 4 is a block diagram illustrating one embodiment of a super node that is configured to communicate a backup-restore request in a peer-to-peer grid based system, in accordance with an embodiment of the present invention.

FIG. 4 shows an embodiment of a super node 400. Preferably, the super node 400 includes one or more central processing units (CPU) 404, a local storage device 402, a user interface 406, a network interface 408, a memory 410, and a communication component 420. The CPU 404 is configured generally to execute operations within the super node 400. The user interface 406, in one embodiment, is configured to allow a user to interact with the super node 400, including allowing input data and commands from a user and communicating output data to the user. The network interface 408 is configured, in one embodiment, to facilitate network communications of the super node 400 over the communications channel 150 of the grid network 100. The local memory 410 is configured, in one embodiment, to store several data and metadata files that may be used in conjunction with a grid backup operation. In an alternative embodiment, some or all of these data and metadata files may be replicated in the local storage device 402. In a further embodiment, one or all of these data and metadata files may be stored exclusively in the local storage device 402 rather than in the memory 410. In another embodiment, one or all of these data and metadata files may be stored in distributed storage on the grid system 100. Although the present description refers to "files," the present invention is understood to operate in substantially the same manner using other electronic memory and storage structures. Reference herein to a data file or metadata file is understood to equivalently refer to other such electronic memory and storage structures.

Further, in one embodiment, the super node preferably comprises a communication component 420 that comprises several modules, including a data backup request module 422, a data retrieval request module 424, a data restore request module 426 and a list generation module 428. Preferably, the communication component of a super node on a grid computing system is provided with a logic unit containing a plurality of modules configured to functionally execute the necessary steps of communicating a data backup-restore request across a plurality of clients on a grid computing system. The purpose of the communication component 420 is to implement various methods of establishing communication (such as, broadcasting or brokering) with multiple target clients and providing the source client with a list of available target clients who are available to receive file or fragment information for backup or who have a data file or data file fragments containing a specific UFID information thereon that a source clients needs to obtain in order to restore an original data file. In a preferred embodiment, the data backup request module 422 processes a data backup request from a source client to one or more target clients. In a preferred embodiment, the data retrieval request module 424 processes a data retrieval request from a source client, whereas, the data restore request module 426 processes a data restore request from a source client. In a preferred embodiment, the list generation module 428 generates a list of all the available target clients that respond to the source client. Preferably, the super node 400 prepares a URL (Uniform Resource Locator) list of the available target clients with the list generation module 428 and sends it to the source client. Preferably, the communication component 420 enables communication within a subnet (sub-network), more preferably, the communication component 420 enables communication between subnets (sub-networks). The communication component 420 plays an important role in those networks where communications are blocked between subnets. For instance, if using a broadcast mechanism, a source client or node may use a protocol where the source client talks or communicates to the super node on a different subnet or network and the super node broadcasts the source client's backup-restore request message to the target clients or nodes which are resident therein. The super node returns the list of the addresses of the target clients which respond to the client's request message. The source client then connects directly to some or all of the target clients on the list. Hence, this type of communication protocol mechanism can pass through firewalls. Alternatively, in the embodiment where there is no super node used, if a broadcast is used and permitted, the source client node simply broadcasts its backup-restore request or message on a particular port and listens to which target clients respond to the backup-restore request broadcasted by the source client.

Figure 5:
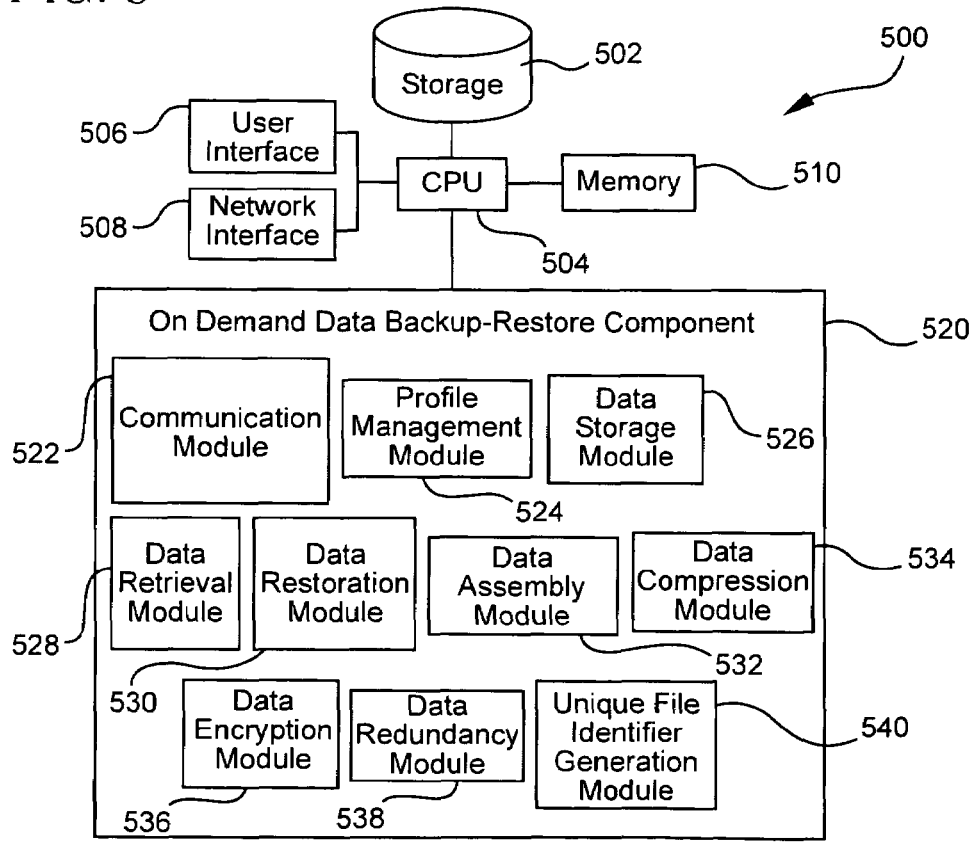
FIG. 5 is a block diagram illustrating one embodiment of a client that is configured to initiate and/or perform a backup-restore request in a peer-to-peer grid based system, in accordance with an embodiment of the present invention.

FIG. 5 shows an embodiment of a client, preferably, a client that can act either as a source client or as a target client, and is configured to either initiate or perform a data backup-restore request on a peer-to-peer grid computing system 300. The client 500 preferably includes one or more central processing units (CPU) 504, a local storage device 502, a user interface 506, a network interface 508, a memory 510, and an on demand data backup-restore component 520. The CPU 504 is configured generally to execute operations within the client 500. The user interface 506, in one embodiment, is configured to allow a user to interact with the client 500, including allowing input data and commands from a user and communicating output data to the user. The network interface 508 is configured, in one embodiment, to facilitate network communications of the client 500 over the communications channel 150 of the grid network 100. The local memory 510 is configured, in one embodiment, to store several data and metadata files that may be used in conjunction with a grid backup operation. In an alternative embodiment, some or all of these data and metadata files may be replicated in the local storage device 502. In a further embodiment, one or all of these data and metadata files may be stored exclusively in the local storage device 502 rather than in the memory 510.

In a preferred embodiment, the on-demand data backup-restore component 520 of the client 500 includes a communication module 522, a profile management module 524, a data storage module 526, a data retrieval module 528, a data restoration module 530, a data assembly module 532, a data compression module 534, a data encryption module 536, a data redundancy module 538, and a unique file identifier generation module 540. The communication module establishes, preferably, either via broadcasting or brokering the peer to peer connections with target clients on which to store or to retrieve stored data. This module also establishes communication to the super node if a super node is used. The profile management module 524 facilitates management of default and unique client profile that is specific to the client (e.g. distance criteria, etc.). The data storage module 526 stores backup data received from other peer nodes in the storage 502 or memory 510. The data retrieval module 528 retrieves backup data from other peer nodes. The data restoration module 530 restores or recreates data lost or destroyed in an original data file backed up on peer nodes. The data assembly module 532 assembles multiple data into a format similar or identical to the original data file. The data compression module 534 compresses data to be backed up and decompresses data to be restored. The data encryption module 536 encrypts data to be backed up. The data redundancy module 538 duplicates, via a redundancy algorithm, data to be backed up. The unique file identifier generation module 540 generates a unique file identifier (UFID) for each original data file residing on the client.

In a preferred embodiment, the memory 410 and/or 510 and/or local storage 402 and/or 502 each includes a local client profile (not shown in FIGS. 4 and 5, but discussed with reference to FIG. 6), a global client profile (not shown in FIGS. 4 and 5, but discussed with reference to FIG. 7), a data assembly record (not shown in any of the drawings), and a log (not shown in any of the drawings). The data assembly record, in one embodiment, is configured to store information about the order in which several packets of information pertaining to a single backup file should be assembled so that the restored backup file accurately reflects the information stored in the file that was originally backed up. The log, in one embodiment, may be configured to store a backup history that logs one or more backup grid application operations over a period of time. In this way, the log may facilitate reviewing a backup history, as well as possibly restoring a grid status or recreating a client that existed prior to execution of a given backup grid application. Also, a log can prove to be an aid in debugging a problem or failure.

Referring to FIG. 6, the local client profile 600, in one embodiment, is configured to store a client identifier field 602, a compression parameter 606, a redundancy parameter 608, an encryption parameter 610, a data backup proximity field 612, a data packet proximity field 614, a client storage parameter 615, a client processor field 616 and a client bandwidth field 618. The local client profile 600, in one embodiment, is configured to store a unique client profile and, in a further embodiment, may store a data unit profile. The client identifier field 602 stores a client identification parameter, such as, a client name or number. The compression parameter 606 stores default compression parameters. The redundancy parameter 608 stores default redundancy parameters. The encryption parameter 610 stores default encryption parameters. The data backup proximity field 612 indicates a geographical limitation (physical or logical distance) between the source client and the target client on which backup data is stored. This parameter forces a distance between the source client and target client—typical use would be to set a minimum or maximum distance e.g. no data closer than X or no data farther they Y or both. The data packet proximity field 614 indicates a minimum or maximum physical (miles) or logical (IP address) distance between several target clients on which the backup data is stored. This parameter forces a distance between target clients from themselves. Typical use would be to set a minimum or maximum distance between target clients from themselves. The client storage parameter 615 stores a default client storage allocation parameter, for instance, an amount of client storage dedicated to the grid system. The client processor field 616 stores processor capability, whereas, the client bandwidth field 618 stores bandwidth capacity. Alternatively, in another implementation, the local profile in FIG. 6 can store the client settable profile parameters. In another implementation, the local client profile is modifiable by the local client under restrictions limited by the global client profile.

Referring to FIG. 7, the global client profile 700, in one embodiment, is configured to store a network identifier field 702, a network allocation field 704, a client identifier field 706, a compression parameter 708, a redundancy parameter 710, an encryption parameter 712, a client backup proximity field 714, a client packet proximity field 716, a client storage parameter 718, a client processor field 720 and a client bandwidth field 722. The network identifier field 702 stores a network identifier for a particular network system within the grid system. The network allocation field 704 stores a network allocation parameter that indicates the network performance resources (bandwidth, etc.) that are dedicated to the system or this grid system. The client identifier field 706 stores a client identification parameter, such as a client name or number. The client identifier field 706 may include the above network identifier field 702 information. The compression parameter field 708 stores the global compression parameters. The redundancy parameter field 710 stores the global redundancy parameters. The encryption parameter field 712 stores the global encryption parameters. The client backup proximity field 714 indicates a geographical limitation (physical or logical distance) between the source client and the target client on which backup data is stored. The client backup proximity field 714 forces a distance between the source client and target client—typical use would be to set a minimum or maximum distance e.g. no data closer than X or no data farther they Y or both. The client packet proximity field 716 indicates a minimum or maximum physical (miles) or logical (IP address) distance between several target clients on which the backup data is stored. The client packet proximity field 716 forces a distance between target clients from themselves. Typical use would be to set a minimum or maximum distance between target clients from themselves. The client storage parameter 718 stores a default client storage allocation parameter (amount of client storage dedicated to this system or the grid system). The client processor field 720 stores processor capability. The client bandwidth field 722 stores bandwidth capacity.

Preferably, the global client profile is set by a specific client on the grid computing system, or more preferably, a subscription manager (not shown in any of the diagrams) configured to manage a contractual subscription for each of the plurality of clients on the grid computing system. Of significance, is the fact that a subscription manager is an optional feature of the data backup-restore operation described herein, since the data backup-restore process can be carried out without a subscription manager. However, for business reasons, such as, revenue, profit, etc., it preferably is a good option to have a subscription manager. Alternatively, the super node may concurrently act as a subscription manager of a grid computing system, since the hardware that performs the function of a super node can also perform the function of a subscription manager and/or a client for backing up and restoring its own data.

Accordingly, a client in a grid computing system can use a global client profile to maintain control information about the client—for instance, subscription information, data assembly record, log, etc. Having a global client profile or access to the control information in such profile for on-demand types of solutions would allow the client to have limitations, preferences, etc. which can be set at a global level. For example, a business could set the global probability of restoring data (also referred to as a predefined restoration level) to be less than 95% and, thus, directly impact its cost of using this solution by taking some calculated risk on restoring data. The business could at a later time, for instance, when the business was running better, a legal need arises, etc. change the global probability of restoring data to a higher level, for example, 99.5% and, thus, provide a better probability of restoring data. Further, the local client profile via the profile management module preferably uses the global client profile to restrict, limit, set, drive, etc. the local client profile, as appropriate. Thus, the local client profile is forced to operate within the global constraints or ranges set by the global client profile. However, the local client profile can be used to allow the local user of the client to be able to have some ability to adjust, but not have a major impact on cost. Accordingly, a global client profile allows a business to control certain parameters, range of parameters, etc. and, thus, the ability to set a global client profile can have a direct impact on cost—especially if the backup-restore process utilizes a subscription manager. Although, the local and global client profiles are discussed as residing in the memory, these profiles are not restricted to being memory resident only. These profiles could be storage or disk resident or both memory and storage resident, etc.

In another embodiment, the invention provides a method of providing a trackless data backup-restoration service for backing up and restoring data across a plurality of clients in a grid computing system. The method comprises providing the plurality of clients, one of the clients being a source client configured to initiate a trackless data backup-restore request and a plurality of clients being target clients configured to perform the trackless data backup-restore request. The method further comprises supplying a trackless data backup-restore software to the plurality of clients, where the trackless data backup-restore software preferably includes a super node list containing at least one super node that is configured to broker the trackless data backup-restore request from the source client to the plurality of target clients. The method further comprises communicating the trackless data backup-restore request from the source client to a super node on the super node list, the super node transmitting the data backup-restore request from the source client to the plurality of target clients, and the super node forwarding to the source client a list of available target clients that the source client can directly contact for performing the trackless data backup-restore request without the source client tracking a location of the data. Preferably, the providing step further comprises providing a subscription manager for registering the plurality of clients with the trackless data backup-restoration service. In one embodiment, the provided subscription manager tracks backup-restoration service usage of each of the plurality of clients for billing purposes. Preferably, the subscription manager measures a volume of data uploaded and downloaded, and generates a usage metric. Further, the subscription manager translates the usage metric into an actual charge or invoice for each of the clients. Alternatively, the subscription manager sends the usage metric to a billing client, where the billing client translates the usage metric into an actual charge or invoice for each of the plurality of clients. In another embodiment, the supplied trackless data backup-restoration software is licensed to the plurality of clients for a fee. Alternatively, the trackless data backup-restoration software provides renewal reminders to the plurality of clients for renewing the trackless data backup-restoration service.

Figure 8:
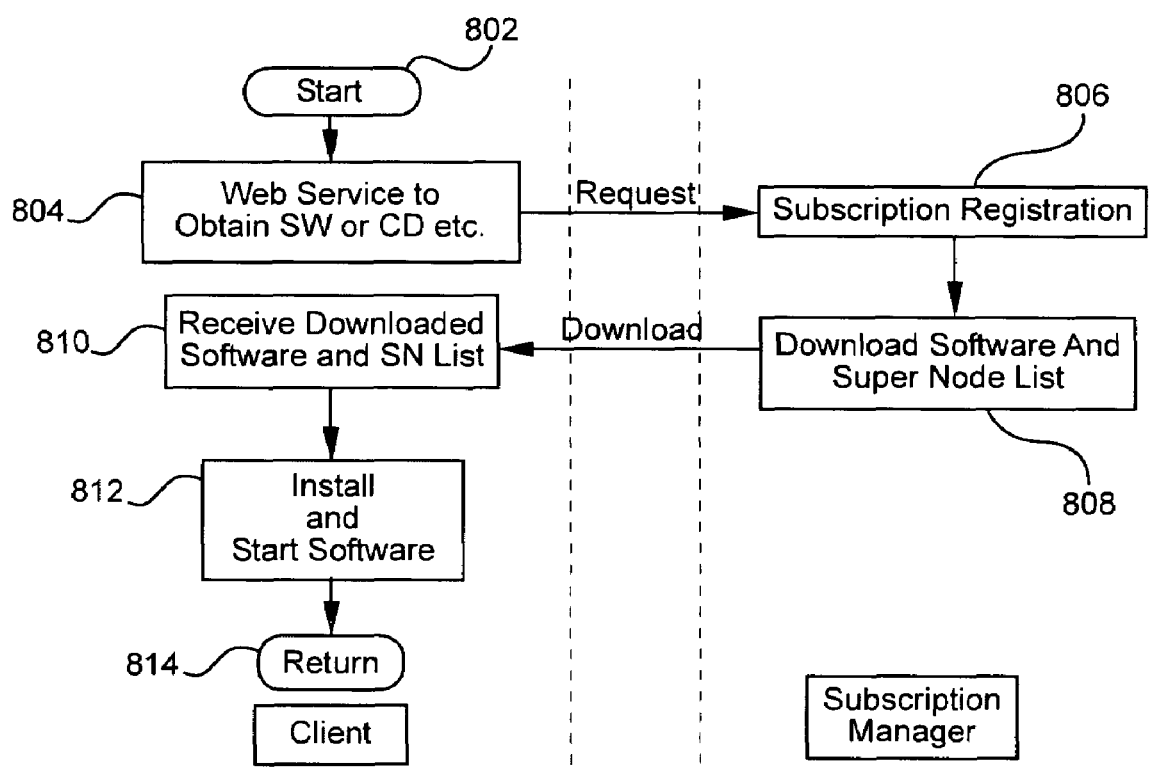
FIG. 8 illustrates a flowchart depicting an initial subscription registration process for backing up and restoring data across clients in a grid computing system, in accordance with an embodiment of the present invention.
Figure 9:
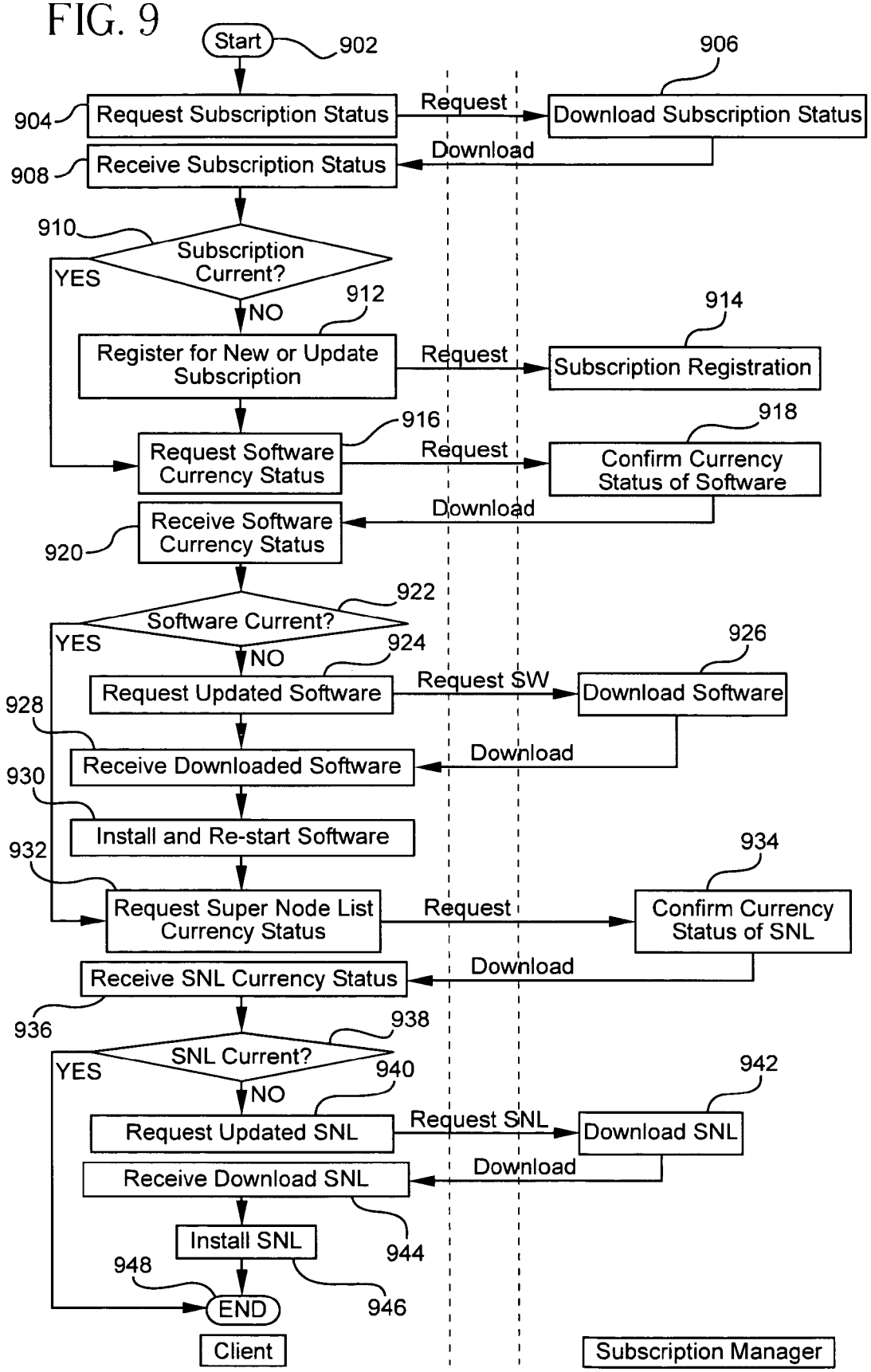
FIG. 9 illustrates a flowchart depicting a subscription update process for backing up and restoring data across clients in a grid computing system, in accordance with an embodiment of the present invention.
Figure 10:
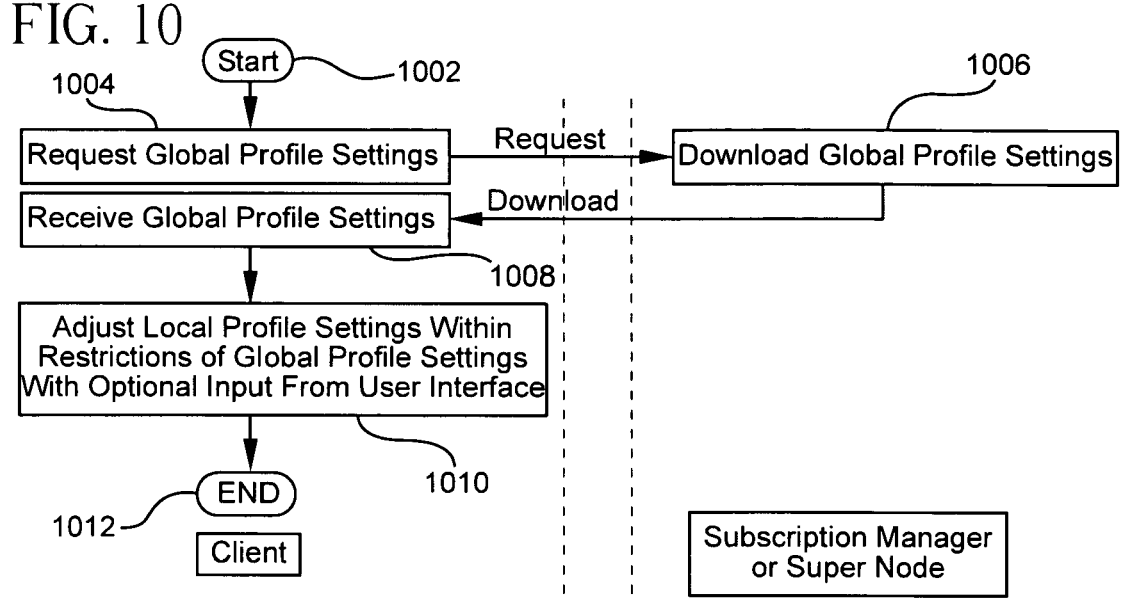
FIG. 10 illustrates a flowchart depicting a profile setting process for a backup-restore grid based system, in accordance with an embodiment of the present invention.

Reference is now made to FIGS. 8 through 10, which illustrate a method of providing a backup-restoration service, in accordance with an embodiment of the invention. Turning to FIG. 8, FIG. 8 is a flowchart depicting a subscription registration process for trackless backing up and restoring data across clients in a grid computing system. As shown in FIG. 8, a client first has to request in step 804 a subscription registration. Although, FIG. 8 depicts a subscription manager that handles the subscription registration request, the subscription registration can be handled instead by a super node or even another client. However, in FIG. 8, a subscription manager completes the subscription registration in step 806 and enables downloading of the trackless data backup-restore software, where preferably, the software includes a super node list (as shown in step 808). The client receives the downloaded software containing the super node list in step 810. Next, in step 812, the client installs and starts the trackless data backup-restore software in 812. Many other methods of subscription are also possible, including the use of a fixed time period billing where minimal parameters are required to be exchanged. The subscription manager may also provide a security key for saving common files on the network, an encryption and/or decryption key for encrypting/decrypting files. This way should an entire source client be lost, stolen, destroyed, the subscription manager, with proper approval, could provide a new source client with the personalization information to allow it to begin the retrieval process for the destroyed source client lost information.

When a user at a client starts the trackless data backup-restore software that has been installed on the client, as shown in FIG. 9, the software automatically requests subscription status (step 904) from the subscription manager. The subscription manager downloads the subscription status in step 906 and forwards the information to the client. The client receives the subscription status in 908. The client checks to see whether or not the subscription is current in step 910. If the subscription is not current, the client registers for a new or updated subscription in step 912 by registering with the subscription manager in step 914. If the subscription is current, the client checks with the subscription manager the software currency status in step 916, that is, the client requests the version of the software. The subscription manager provides the software currency status (version of the software) in step 918, which software currency status is received by the client in step 920. The client determines if the software currency status is current in step 922. If the software is not current, the client requests an updated software form the subscription manager in step 924. The subscription manager provides a downloadable software in step 926, which is sent to and received by the client in step 928. The client installs the current version of the software and restarts the software in step 930. The client then checks the super node list (SNL) currency in step 932. The subscription manager confirms the currency status of the super node list in step 934 and forwards the information to the client, which receives the super node list currency status in step 936. The client determines whether or not the super node list is current in step 938. If the super node list is current, the process ends at 948 and the client is ready to use the software. However, if the super node list is not current, the client requests an updated super node list from the subscription manager in step 940. The subscription manager enables downloading of the super node list in step 942, which is received by the client in step 944. The client then installs the current super node list (SNL) in step 946.

When a backup-restore application is activated, started, or other wise becomes in use by a client, the client preferably contacts a subscription manager (as shown in FIG. 9). During this process, the client may exchange some parametric information which may be saved in the local client profile. This information may include usage statistics, amount of storage provided to the network for backup, amount of storage in use from the network, redundancy levels, etc. The subscription manager manages the cost to the user or business for this subscription based on these parameters. Accordingly, as shown in FIG. 10 in step 1004, the client requests global profile settings from preferably, a subscription manager or alternatively a super node. The subscription manager or super node enables downloading of the global profile settings in step 1006. The client receives the global profile settings in step 1008 and adjusts in step 1010 the local profile settings in accordance with the restrictions of the global profile settings received. Optionally, the user can input additional profile settings through the user interface in step 1010, shown in FIG. 10.

In yet another embodiment, the invention provides a method for trackless backup and restoration of data across a cluster of client or peer nodes. The method comprises providing the cluster of client nodes connected to a network communications channel, the cluster of client nodes including a source client configured to initiate a trackless data backup-restore request for one or more data files and a plurality of target clients configured to perform the trackless data backup-restore request corresponding to the one or more data files. In a preferred embodiment, the providing step comprises providing client nodes that include at least one super node configured to broker an initial communication regarding the trackless data backup-restore request between the source client and the plurality of target clients. More preferably, the providing step comprises providing the cluster of client nodes that includes a subscription manager configured to manage a contractual subscription for each of the client nodes. The method for trackless backup and restoration of data further includes seeking available target clients from the plurality of target clients for performing the trackless data backup-restore request. In the embodiment that includes a super node, the seeking step further comprises the super node communicating the trackless data backup-restore request from the source client to the plurality of target clients and the super node receiving communication from the available target clients, and the super node supplying the source client with a list of the available target clients. Further, the method includes establishing connections with a subset of the available target clients, and directing the trackless data backup-restore request by employing the subset of the available target clients without tracking a location of the data. The establishing step further comprises transmitting the trackless data backup-restore request, and receiving a response from the available target clients. Preferably, the trackless data backup-restore request comprises one of: backing up one or more data files, backing up one or more of a plurality of data file fragments, restoring one or more data files, retrieving one or more data files, retrieving one or more of a plurality of data file fragments, restoring one or more of a plurality of data files and restoring a client that has experienced a loss of data.

Preferably, the provided super node comprises a communication module configured to broker the initial communication of the trackless data backup-restore request between the source client and the plurality of target clients. More preferably, the communication module includes a data backup request module that processes a data backup request from a source client to one or more target clients, a data retrieval request module that processes a data retrieval request from a source client to one or more target clients, a data restore request module that processes a data restore request from a source client to one or more target clients and a list generation module that generates a list of all the available target clients that respond to a request from the source client. Furthermore, the provided source client and the provided target clients each comprises an on demand data backup-restore component that includes a communication module for establishing communication, preferably, either via broadcasting or brokering to the super node, if a super node is used, as well as for establishing peer-to-peer connections with target clients on which to store or to retrieve stored data, a profile management module for facilitating management of a default and unique client profile that is specific to the client, a data storage module for storing, in the storage or memory, backup data received from other peer nodes, a data retrieval module for retrieving backup data from other peer nodes, a data restoration module for restoring backup data retrieved from other peer nodes, a data assembly module for assembling multiple data into a format similar or identical to the original data file, a data compression module for compressing data to be backed up and decompressing data to be restored, a data encryption module for encrypting data to be backed up, a data redundancy module for duplicating, via a redundancy algorithm, data to be backed up, and a unique file identifier generation module for generating a unique file identifier (UFID) for each original data file residing on the client.

Further yet, in another embodiment, each of the provided client nodes comprises a local client profile, a global client profile, a data assembly record, and a log. The client profile is configured to store a unique client profile and, in a further embodiment, may store a data unit profile. Preferably, the local client profile of each of the provided client nodes comprises a client identifier field that is configured to store client identification, such as, a client name or number, a compression parameter that is configured to store default compression parameters, a redundancy parameter that is configured to store default redundancy parameters, an encryption parameter that is configured to store default encryption parameters, a data backup proximity field that is configured to store a default geographical limitation (physical or logical distance), such as, a minimum or maximum distance between the source client and the target client on which backup data can be stored, a data packet proximity field that is configured to store a default physical (miles) or logical (IP address) distance between several target clients on which backup data can be stored, a client storage parameter that is configured to store default client storage allocation parameters, a client processor field that is configured to store processor capability and a client bandwidth field that is configured to store bandwidth capacity.

Moreover, the global client profile is configured to maintain control information about the client and to enable adjusting certain parameters, range of parameters, etc. that effect control information. Preferably, the global client profile of each of the provided client nodes comprises a network identifier field that is configured to store a network identifier for a particular network system within the grid, a network allocation field that is configured to store a network allocation parameter that indicates the network performance resources (bandwidth, etc.) that are dedicated to the system or this grid system, a client identifier field that is configured to store a client identification parameter, such as a client name or number, a compression parameter that is configured to store the global compression parameters, a redundancy parameter that is configured to store the global redundancy parameters, an encryption parameter that is configured to store the global encryption parameters, client backup proximity field that is configured to store a geographical limitation (physical or logical distance), such as, a minimum or maximum distance between the source client and the target client on which backup data can be stored, client packet proximity field that is configured to store a physical (miles) or logical (IP address) distance between several target clients on which backup data can be stored, a client storage parameter that is configured to store default client storage allocation parameters, client storage parameter that is configured to store a client storage allocation parameter (amount of client storage dedicated to this system or the grid system), a client processor field that is configured to store processor capability and a client bandwidth field that is configured to store bandwidth capacity. In one embodiment, the data assembly record is configured to store information about the order in which several packets of information pertaining to a single backup file should be assembled so that the restored backup file accurately reflects the information stored in the file that was originally backed up. Further, the log, in one embodiment, is configured to store a backup history that logs one or more backup grid application operations over a period of time.

Figure 11:
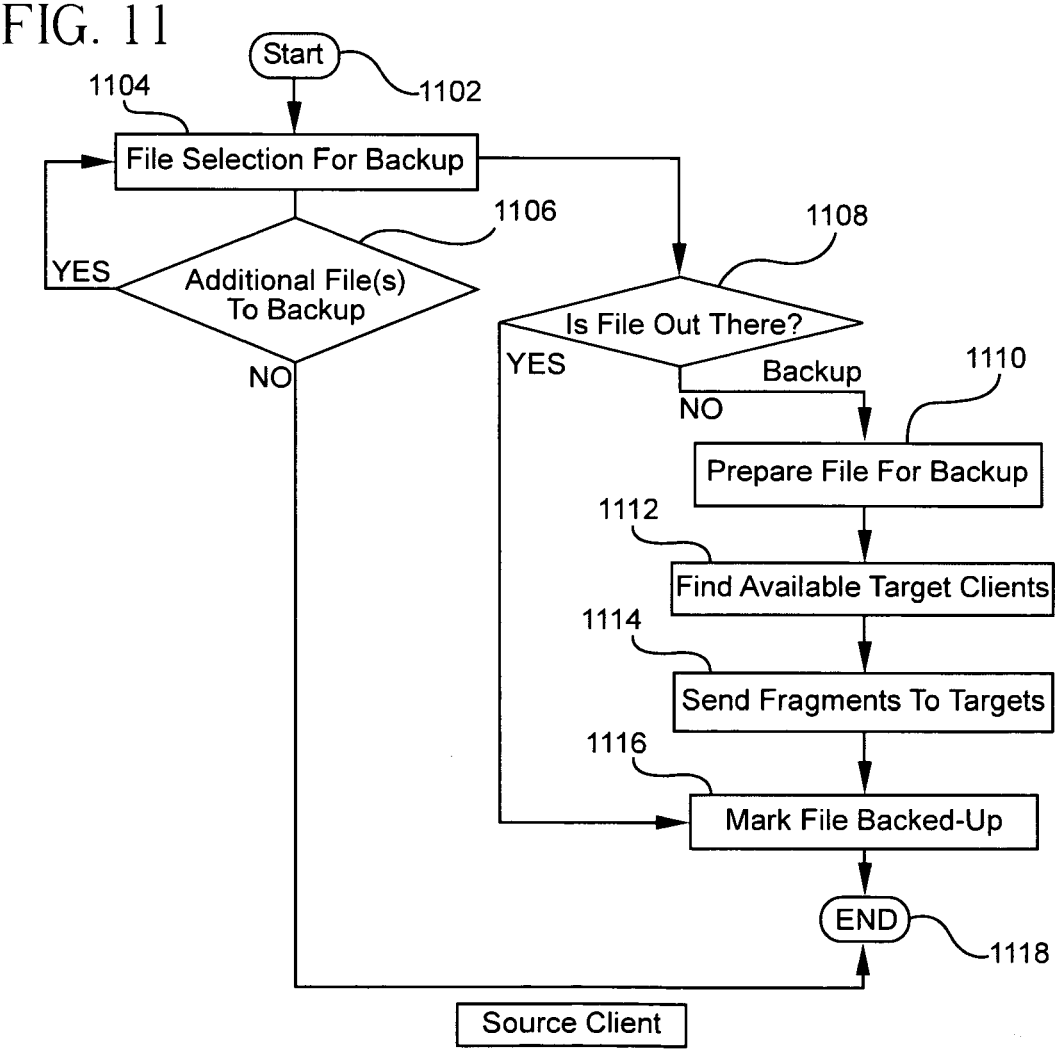
FIG. 11 illustrates a flowchart depicting a high level process flow for a backup and restore system, in accordance with an embodiment of the present invention.

Turning to FIG. 11, FIG. 11 outlines the overall process utilized by a source client when deciding whether or not a data file needs to be backed up. The process starts with the source client selecting a data file for backup in step 1104. The source client first determines if the file is out there in step 1108, that is, whether the data file has been backed up previously, as will be described in FIGS. 12 and 13 herein below. If the file is found in step 1108, the file is marked backed up in step 1116. If the data file has not been backed up, then the source client in step 1110 prepares the file for backing up as described in the process outlined in FIG. 14. The source client then proceeds to find available target clients in step 1112 using the methods described either in FIG. 15A or 15B. The source client sends the data file fragments in step 1114 to the available target clients as described in the process of FIG. 16. After sending the data file fragments to various target clients, the source client marks the data file backed up in step 1116. Furthermore, the source client determines in step 1106 if there are additional files to be backed up, and if so, the source client repeats the process starting with step 1104 of selecting the data file for backup.

Figure 12:
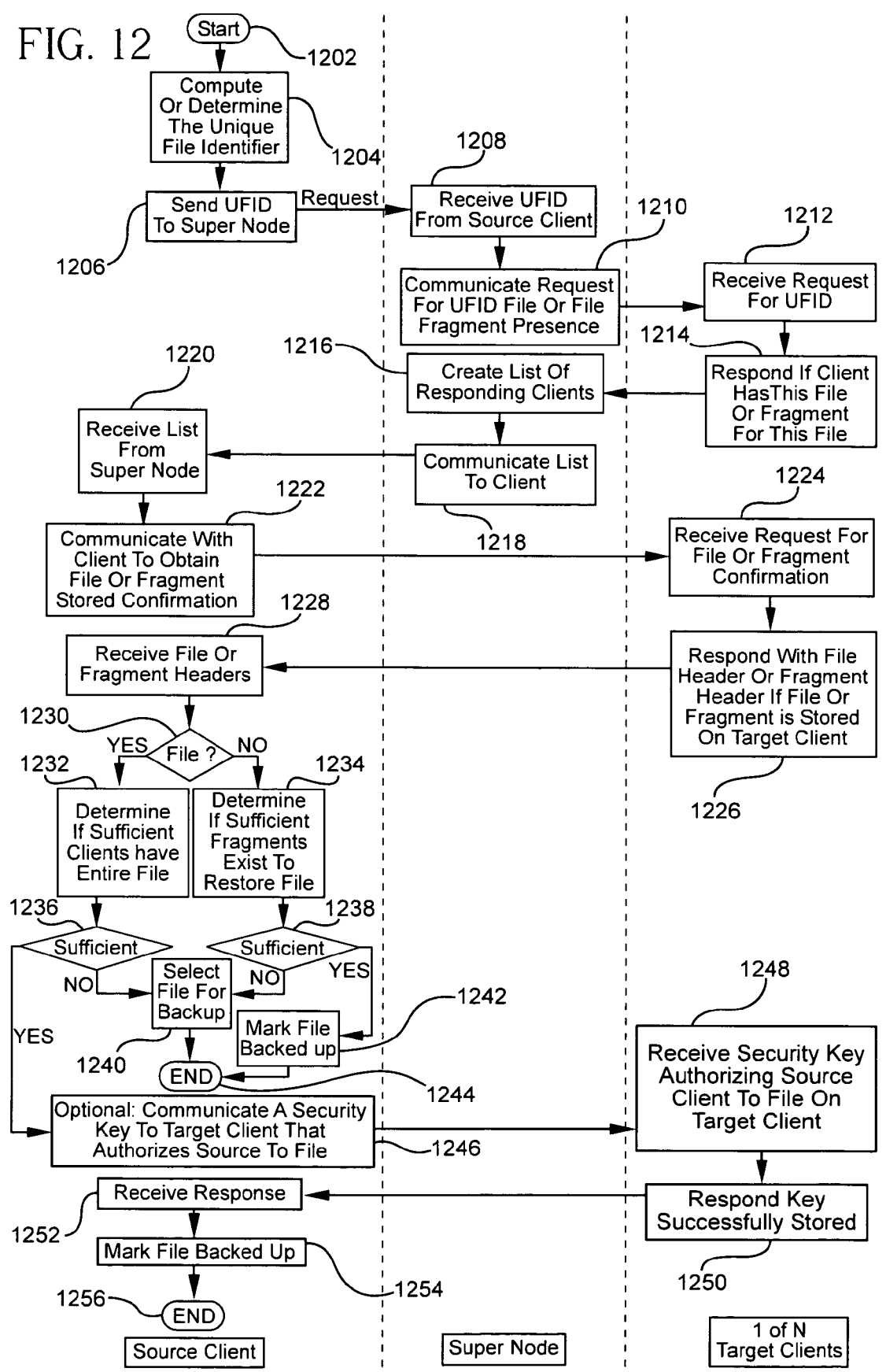
FIG. 12 illustrates a flowchart depicting a method of determining whether a data file has already been backed up across clients in a grid computing system, in accordance with an embodiment of the present invention.
Figure 13:
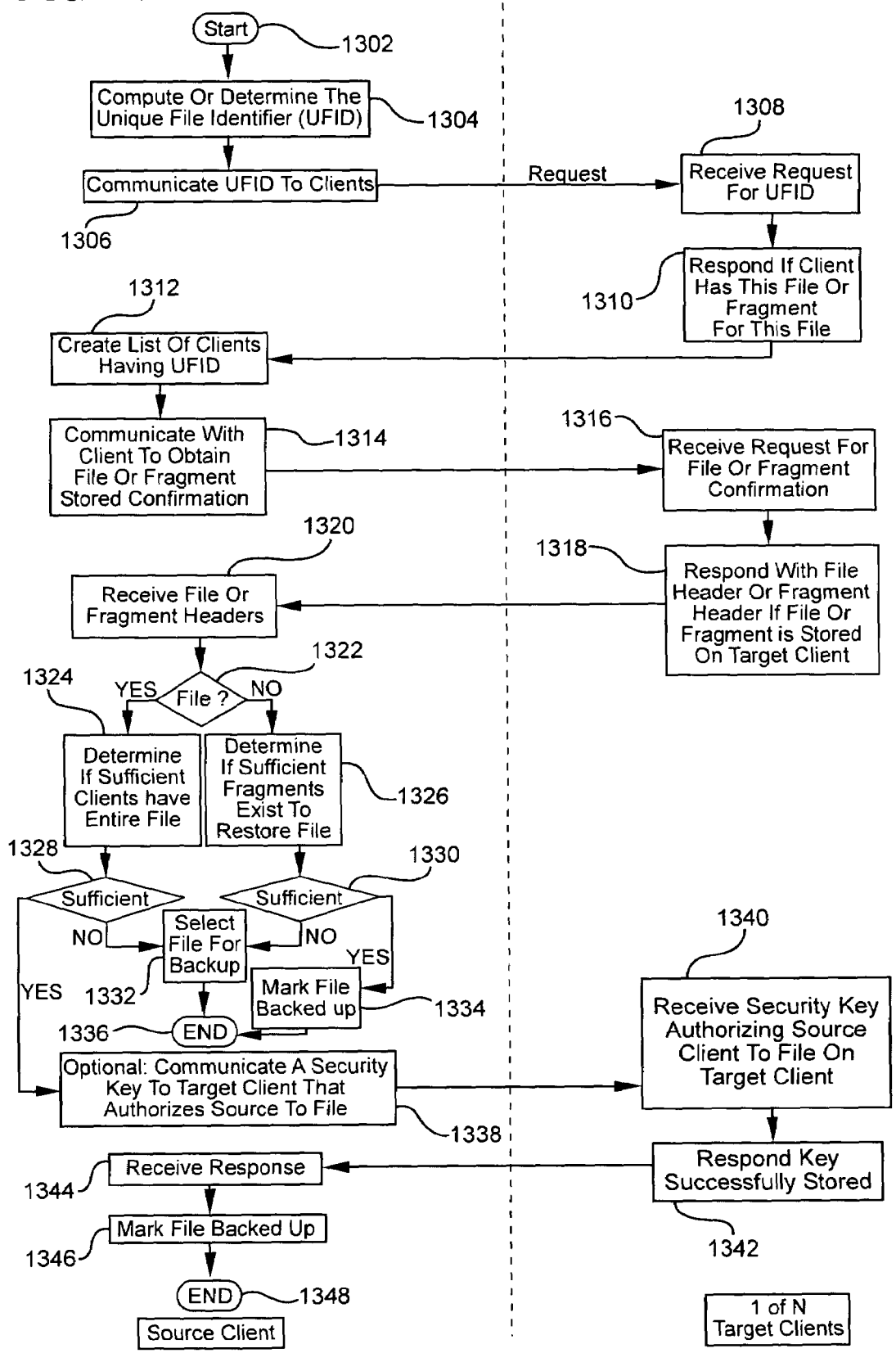
FIG. 13 illustrates a flowchart depicting an alternate method of determining whether a data file has already been backed up across clients in a grid computing system, in accordance with an embodiment of the present invention.

Referring to FIGS. 12 and 13 both outline a method of determining whether a data file has already been backed up across clients in the grid computing system before taking any steps to back up the data file. In particular, FIG. 12 depicts the method of determining whether a data file has previously been backed up by using a super node, whereas, FIG. 13 depicts an alternate method of determining whether a data file has been previously backed up, without employing a super node. As shown in FIG. 12, the source client computes or determines in step 1204 the unique file identifier (UFID) that represents the data file in order to find out if the file has already been adequately stored or backed up on one or more target clients. Next, the source client sends the UFID to the super node in step 1206 to see if the data file has been adequately backed up. The super node receives the UFID in step 1208 and communicates the UFID request to one or more target clients in step 1210 to see if there are any data files or data file fragments containing that particular UFID. The request is received by the target clients in step 1212. The target clients that have data file or data file fragments that contain that specific UFID respond to the super node in step 1214. The super node creates a list, preferably a URL list of target clients in step 1216 that responded to the request for data file or data file fragment containing the specific UFID and communicates the URL list to the source client in step 1218. The source client receives the list in step 1220 and establishes direct connection with one or more of the target clients on the list in step 1222 sending a request to obtain the data file or data file fragments containing the particular UFID. Each of the target clients that are connected to the network communications channel who receive the request for the data file or data file fragments in step 1224 respond to the source client in step 1226 providing the source client with the file header or fragment headers stored on the target client. The source client receives the file header or fragment headers in step 1228 and determines in step 1230 if it is the select data file with the specific UFID. If it is the data file with the specific UFID, the source client determines in step 1232 if sufficient target clients have the entire file. If the source client determines that sufficient clients do not have the entire file in step 1236, then the source client selects the file for backup in step 1240. If in step 1230, the source client determines that the file is not the data file, then the source client determines in step 1234 if sufficient data file fragments exist for the select data file. If sufficient data file fragments exist in step 1238, then the source client marks the file as being backed up in step 1242, if not, the source client selects the file for backup in step 1240. Preferably, in step 1236, if the source client determines that sufficient clients have the entire file, then the source client directly communicates in step 1246 a security key to the target client which authorizes the source client to file on the target client. The security key is received by the target client in step 1248 and the target client sends a response to the source client in step 1250 that the security key has been successfully stored. The response is received by the source client in step 1252 and the data file is marked as backed up in step 1254.

Next, turning to FIG. 13, as shown in FIG. 13, the source client computes or determines the unique file identifier (UFID) for the data file in step 1304 in order to find out if the file has already been adequately stored on one or more target clients. Next, the source client communicates the UFID to one or more target clients in step 1306, preferably, via a broadcast to target clients that are listening. The UFID request is received by the target clients in step 1308. The target clients that have data file or data file fragments that contain that specific UFID respond to the source client in step 1310. The source client creates a list, preferably a URL list in step 1312, of target clients that responded to the request for data file or data file fragment containing the specific UFID. The source client establishes direct communication with one or more of the target clients on the list in step 1314 sending a request to obtain the data file or data file fragment headers containing the particular UFID. Each of the target clients that are connected to the network communications channel who receive the request for the data file or data file fragment headers in step 1316 respond to the source client in step 1318 providing the source client with the file header or fragment headers stored on the target client. The source client receives the file header or fragment headers in step 1320 and determines in step 1322 if it is the select data file with the specific UFID. If it is the data file with the specific UFID, the source client determines in step 1324 if sufficient target clients have the entire file. If the source client determines that sufficient clients do not have the entire file in step 1328 then the source client selects the file for backup in step 1332. If in step 1322, the source client determines that the file is not the data file, then the source client determines in step 1326 if sufficient data file fragments exist for the select data file. If sufficient data file fragments exist in step 1330, then the source client marks the file as being backed up in step 1334, if not, the source client selects the file for backup in step 1332. Preferably, in step 1328, if the source client determines that sufficient clients have the entire file, then the source client directly communicates in step 1338 a security key to the target client which authorizes the source client to file on the target client. The security key is received by the target client in step 1340 and the target client sends a response to source client in step 1342 that the security key has been successfully stored. The response is received by the source client in step 1344 and the data file is marked as backed up in step 1346.

Further, in an embodiment of the invention, where the trackless data backup-restore request in the method for trackless backup and restoration of data is for backing up one or more data files, the directing step of the method for trackless backup and restoration of data includes preparing the data file for trackless data backup across clients, so that the source client is able to later retrieve the data file fragments that make up the data file at a later point without knowing the location of where any of the data file fragments are stored or which target clients have which data file fragments. Preferably, the preparing the data file step further comprises selecting one or more data files to be backed up, computing a unique file identifier for each of the data files, adding redundancy to the one or more data files selected based on a plurality of profile settings, fragmenting each of the data files (to which redundancy has been added) into a plurality of data file fragments, encrypting each of the plurality of data file fragments, sending each of the plurality of data file fragments to be backed up to the subset of available target clients without tracking any location of where the data is sent, and then severing connections with the subset of the available target clients.

Figure 14:
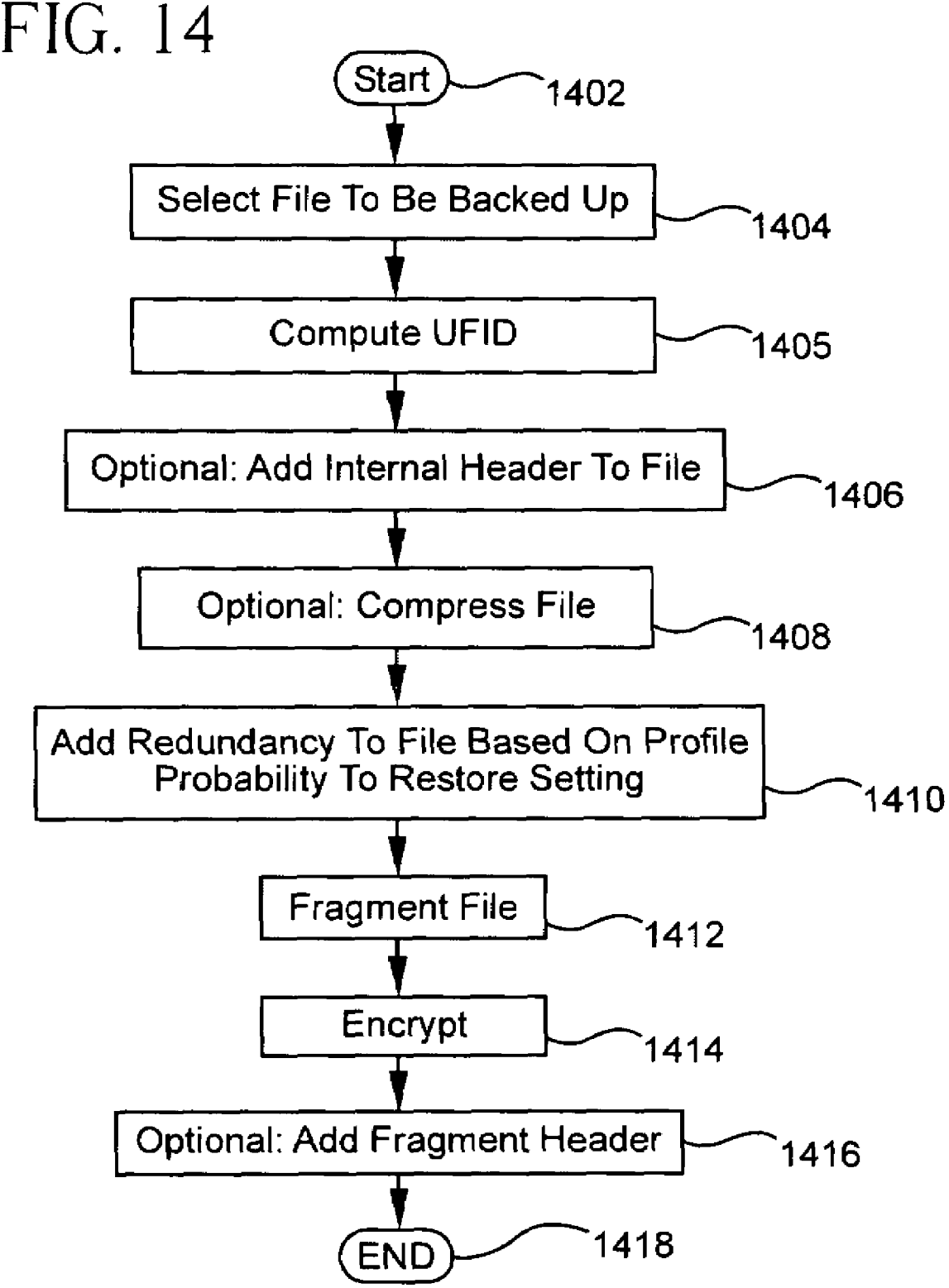
FIG. 14 illustrates a flowchart depicting a method of preparing a data file for backup, in accordance with an embodiment of the present invention.

Accordingly, referring to FIG. 14, when the trackless data backup-restore request is for backing up one or more data files, the directing step includes selecting one or more data files to be backed up in step 1404 and computing a unique file identifier for each of the data files in step 1405. Further, the method preferably comprises adding an internal header to the selected data files in step 1406 and compressing the selected data files in step 1408. The method further comprises adding redundancy to each of the data files selected based on a plurality of profile settings in step 1410, fragmenting into a plurality of data file fragments (in step 1412) each of the selected data files to which redundancy has been added and encrypting each of the plurality of data file fragments in step 1414. Further, preferably, the method comprises adding a fragment header to each of the data file fragments in step 1416, completing the preparation of the file for backup.

Figure 15A:
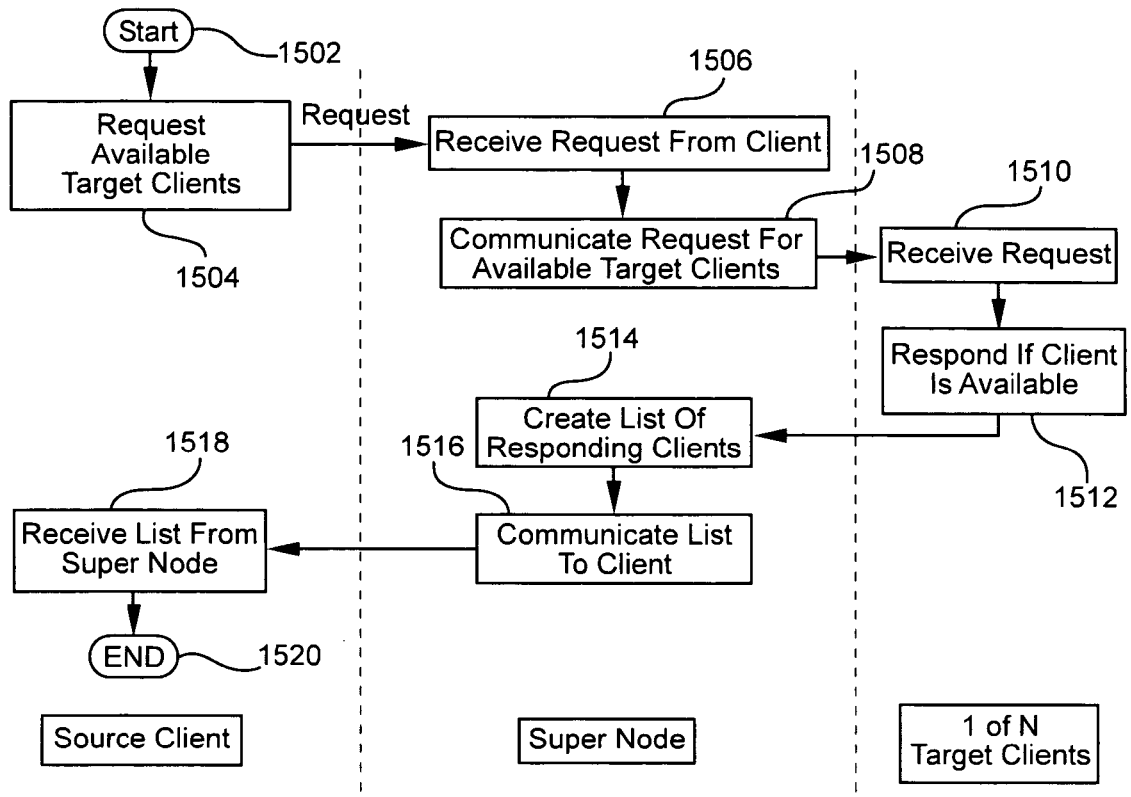
FIG. 15A illustrates a flowchart depicting a method of finding available clients for backing up and restoring data in a grid computing system, in accordance with an embodiment of the invention.
Figure 15B:
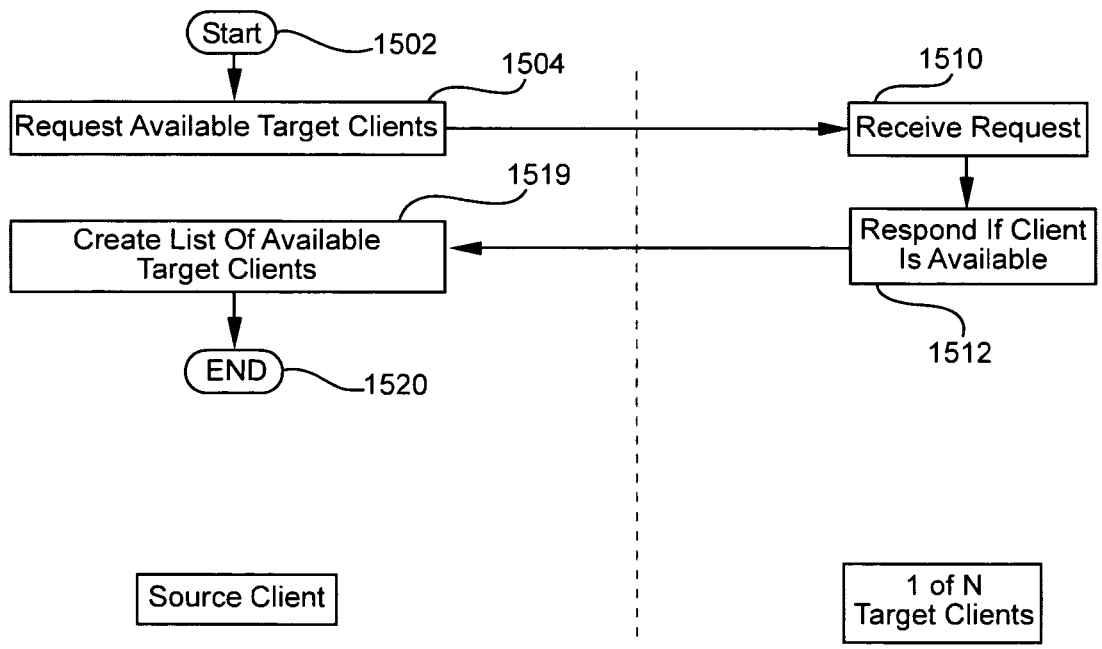
FIG. 15B illustrates a flowchart depicting an alternate method of finding available clients for backing up and restoring data in a grid computing system, in accordance with an embodiment of the invention.

Further, referring to FIGS. 15A and 15B, 15A depicts a method of finding or seeking available target clients for performing a trackless data backup and restore request that employs a super node, whereas, FIG. 15B shows the method of finding or seeking available target clients in a grid computing system that does not employ a super node. Referring to FIG. 15A, a source client communicates a backup-restore request for available target clients to a super node in step 1504. The super node receives the backup-restore request in step 1506 and then communicates the request to multiple target clients in step 1508. The target clients receive the request in step 1510 and the target clients that are available to perform the backup-restore request respond to the super node in step 1512. The super node receives communication from the available target clients and creates a list of the available target clients in step 1514 and communicates the list of available target clients to the source client in step 1516. The source client receives the list of available target clients in step 1518, such that the source client can establish direct connections, immediately or at a later point in time, with a subset (one, more or all) of the available target clients on the received list in step 1518. Alternatively, as shown in FIG. 15B, a source client communicates a backup-restore request for available target clients in step 1504. The backup-restore request is received by one or more target clients in step 1510. The target clients that are available to perform the backup-restore request respond to the source client in step 1512. The source client receives communication from the available target clients and creates a list of the available target clients in step 1519, so that the source client can establish direct connections, immediately or at a later point in time, with a subset (one, more or all) of the available target clients on the list created.

Figure 16:
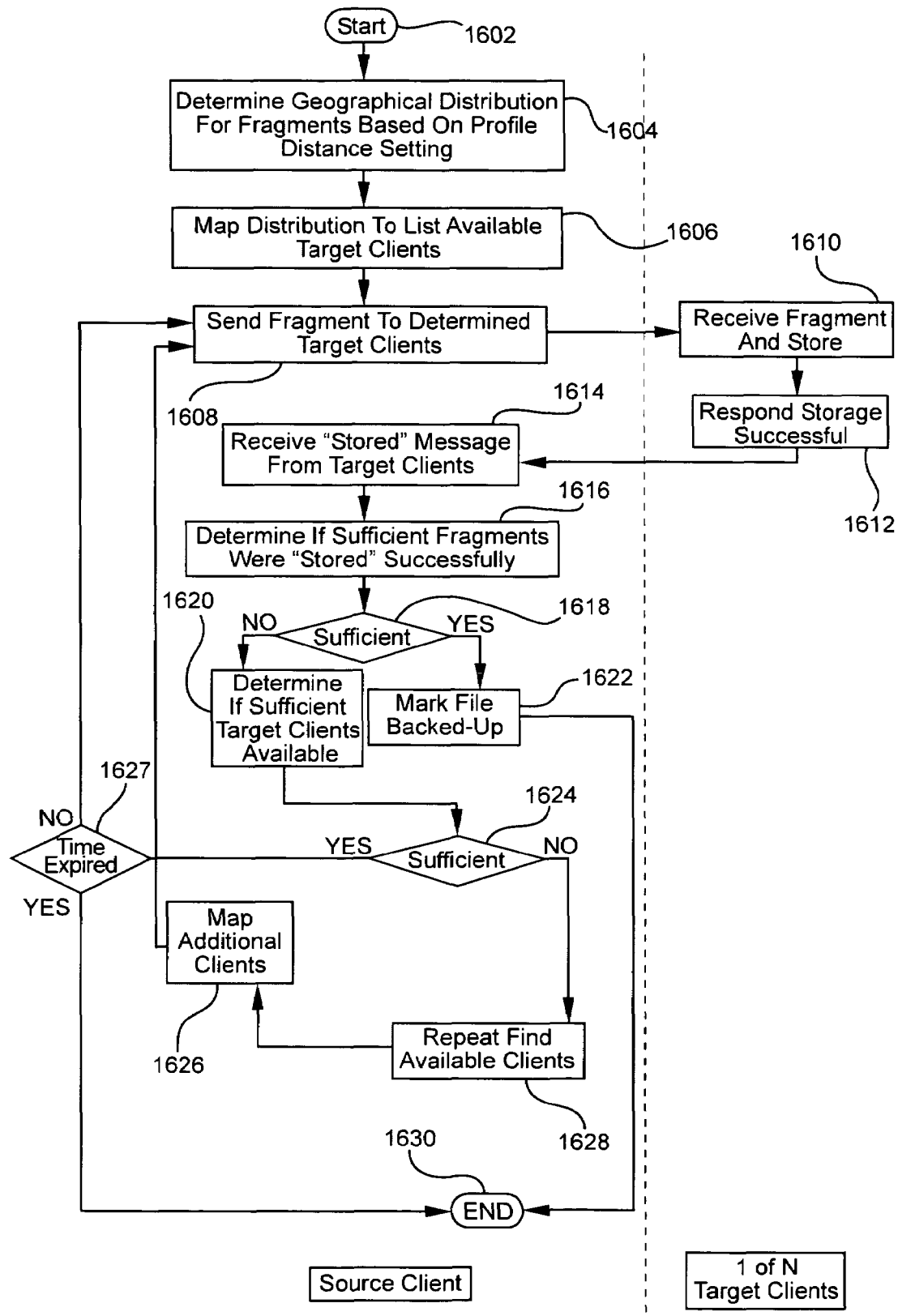
FIG. 16 illustrates a flowchart depicting a method of sending out data file fragments for backup across clients in a grid computing system, in accordance with an embodiment of the invention.

FIG. 16 depicts a method for sending data file fragments to target clients for backing up the data file fragments, in accordance with an embodiment of the invention. As shown in FIG. 16, preferably, prior to the source client sending each of the plurality of data file fragments to be backed up to the subset of available target clients, the method comprises the source client determining the geographical distribution in step 1604 for the data file fragments based on the profile distance setting (set forth in the client profile settings discussed in FIG. 6, which also takes into account the global profile settings discussed in FIG. 7) and mapping the distribution in step 1606 to the list of available target clients. In particular, based on the geographical distances set forth in the local and global profile settings, the source client determines which of the available target clients to exclude or conversely which of the available target clients to include for backup purposes. The backup method further includes sending the data file fragments in step 1608 to the target clients mapped in step 1606, which are the target clients who have met the geographical distribution requirements of the source client in step 1604. The method further includes the target clients receiving the data file fragments and storing the data file fragments in step 1610 and sending a communication to the source client that the storage was successful in step 1612. The method further comprises the source client receiving the successful storage message from the target clients in step 1614, and determining if sufficient data file fragments were stored successfully in step 1616. If the source client determines in step 1618 that sufficient data file fragments were not stored, the source client further determines in step 1620 if sufficient target clients are available to successfully store data file fragments. If the source client determines that sufficient target clients are available in step 1624, the data file fragment will be resent to the client in step 1608, unless a timeout has expired in step 1627. If a timeout has occurred, then the process ends at 1630. However, if the source client determines that sufficient target clients are not available in step 1624, then the source client repeats the sending communication process of finding available target clients in step 1628 by mapping out additional clients in step 1626 (which first includes undergoing steps 1604 and 1606), and then repeating the remainder of the process starting with step 1608 by sending the data file fragments to the target clients that have met the geographical distribution requirements of the source client. The source client establishes direct communication with these target clients meeting geographical distribution requirements for sending the data file fragments.

In another embodiment of the invention, where the trackless data backup-restore request in the method for trackless backup and restoration of data is for restoring one or more data files, the directing step further comprises establishing a predefined restoration level to which the one or more of the data files should be restored, selecting one or more of the data files to be restored and transmitting the trackless data backup-restore request to one or more target clients along with a unique file identifier corresponding to each of the one or more data files to be restored. Preferably, the transmitted request is for one or more data file fragments making up the data files to be restored, each of the data file fragments having a unique file identifier (UFID) associated with it. The method further comprises receiving communication from the available target clients that possess one or more data file fragments corresponding to the unique file identifier corresponding to each of the data files, retrieving one or more of the data file fragments from a subset of the available target clients, assembling each of the data file fragments retrieved from the subset of the available clients to restore one or more or each of the data files, and severing connections with the subset of the available target clients. The method for restoring one or more data files further comprises determining whether a sufficient number of data file fragments have been retrieved to be able to restore each of the data files selected to the predefined restoration level, and if the sufficient number of the data file fragments have not been retrieved, initiating another data backup-restore request for acquiring additional data file fragments to be able to restore each of the data files selected to the predefined restoration level. Preferably, the predefined restoration level is set at less than 100%.

Further, in another embodiment of the invention, where the trackless data backup-restore request in the method for trackless backup and restoration of data is for recreating the client that has experienced a loss of data, the directing step further comprises establishing a predefined restoration level to which to restore the client, recovering the client to an initial base state, regenerating the UFID of the unique identifier (UFID) list file, restoring a unique identifier list file containing a list of all of the unique file identifiers corresponding to all of the data files and/or data file fragments that the client had backed up prior to the loss of data, and employing the unique identifier list file to restore all of the data files that the client had backed up prior to the loss of data. Preferably, the employing step further comprises transmitting the trackless data backup-restore request to the plurality of target clients along with each of the unique file identifiers corresponding to each of the data files to be restored, receiving communication from the available target clients that possess one or more data file fragments corresponding to each of the unique file identifiers transmitted to restore the plurality of data files that the client had backed up prior to the loss of data, retrieving one or more data file fragments corresponding to each of the unique file identifiers transmitted from a subset of the available target clients, assembling each of the data file fragments retrieved from the subset of the available target clients in order to restore each of the data files that the client had backed up prior to the loss of data, and then severing connections with the subset of the available target clients. The method further comprises determining whether a sufficient number of data file fragments have been retrieved to restore each of data files to the predefined restoration level, and if a sufficient number of the data file fragments have not been retrieved, initiating another data backup-restore request for acquiring additional data file fragments to restore each of the data files previously stored on the client to the predefined restoration level. Preferably, the predefined restoration level is set at less than 100%.

Figure 17:
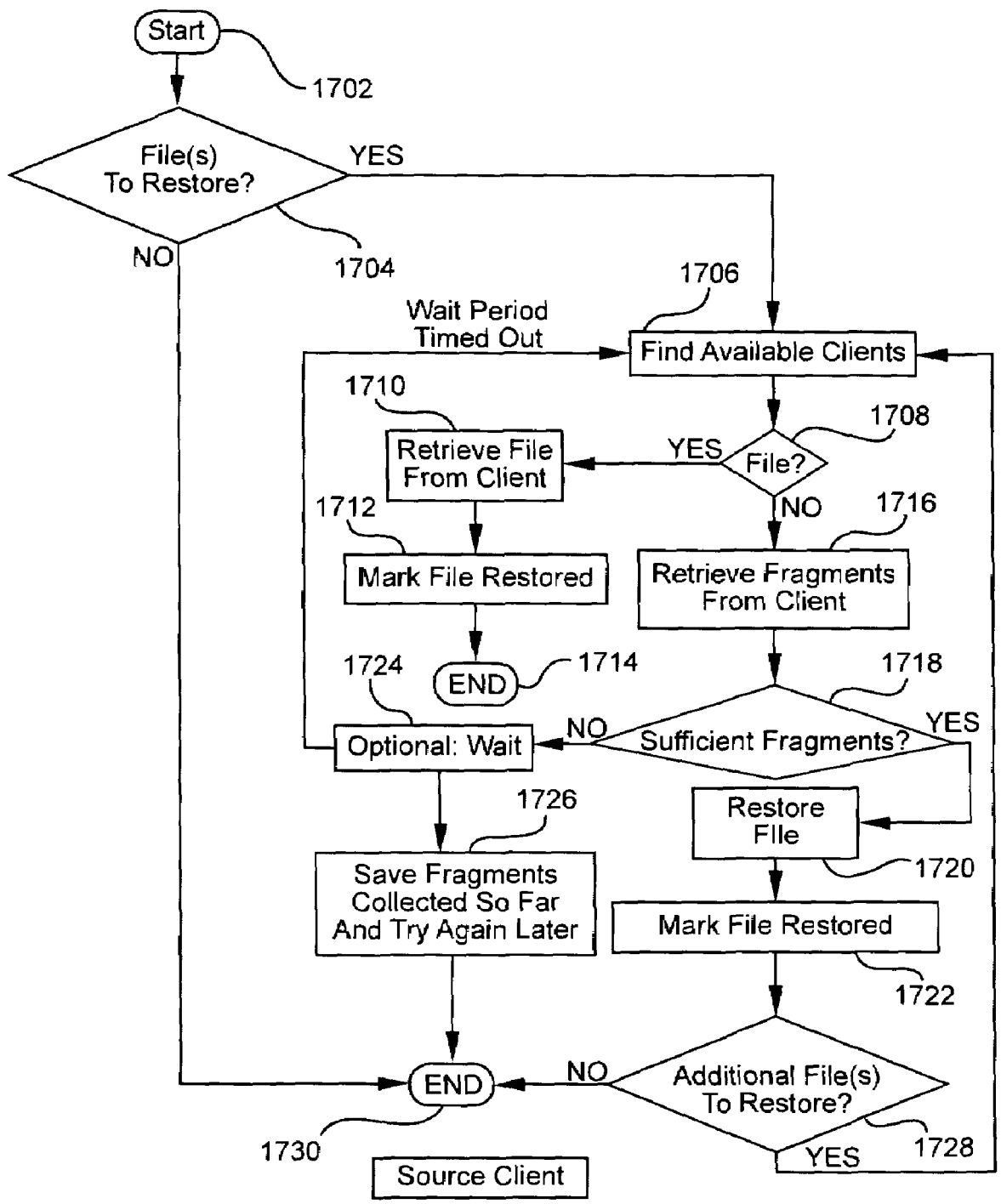
FIG. 17 illustrates a flowchart depicting an overall restore process on a peer-to-peer grid based system, in accordance with an embodiment of the present invention.

Reference is now made to FIGS. 17 through 21, which illustrate a method of restoring one or more data files as well as a method of recreating a client that has experienced a loss of data, in accordance with the invention. Turning to FIG. 17, FIG. 17 depicts an overall method of restoring a data file that has been stored using a trackless data backup and restore method, in accordance with an embodiment of the invention. The source client determines whether it needs to restore a data file in step 1704. If yes, the source client finds available clients for restoring the data file in step 1706, using the methods outlined in either in FIG. 18A or FIG. 18B (discussed herein below). The source client determines in step 1708 if the request is for retrieving a data file or data file fragments. If the source client determines that the request is for a file, the source client retrieves the data file from the target client in step 1710 and marks the file restored in step 1712, which ends the restore process at 1714. However, if the source client determines that the request is for retrieving data file fragments, the source client retrieves the data file fragments from the target client in step 1716 from the list of target clients determined in FIGS. 18A and 18B. The source client then determines if sufficient data file fragments have been retrieved in step 1718 in order to proceed to restore the file. If sufficient fragments have been retrieved, the source client restores the file in step 1720 and marks the file as being restored in step 1722. However, if the source client determines that sufficient data file fragments have not been retrieved from the target clients in step 1718, the source client preferably waits for a time period in step 1724 before repeating the process starting with step 1706. In other words, the source client retrieves the data file fragments and after all the data file fragments have been received, then the source client deals with the issue of whether or not it has received a sufficient number of data file fragments. If it has not, the source client repeats the process. That is, the information which comes back to a source client is volatile in that even though the super node may have returned a list of target clients storing data file fragments for the data file which the source client wants restored, by the time the source client asks for them those target clients may have disconnected from the network, gotten busy, etc., so at that moment, the data file fragments that those target clients contain are not available. So the source client would preferably try to retrieve more data file fragments to reach the minimum number required to restore the original file. However once it retrieves the minimum number it can terminate trying to retrieve any more.

More preferably, the source client saves the data file fragments collected to that point for trying again at a later period in step 1726. Further, the source client determines if additional files need to be restored in step 1728, and if so, the source client repeats the process starting at step 1706.

Figure 18A:
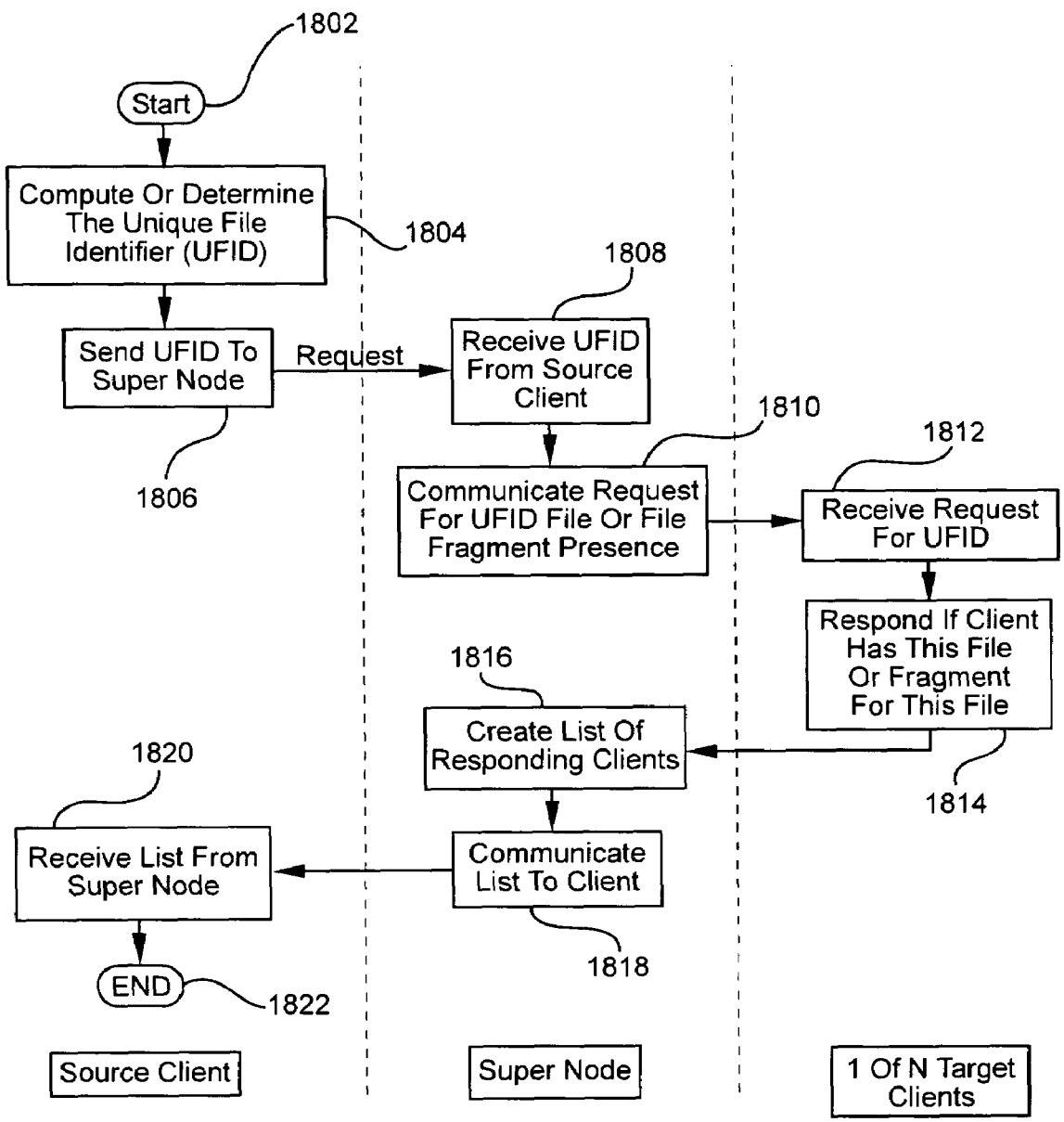
FIG. 18A illustrates a flowchart depicting a method of finding clients for restoring data in a peer-to-peer grid computing system, in accordance with an embodiment of the invention.
Figure 18B:
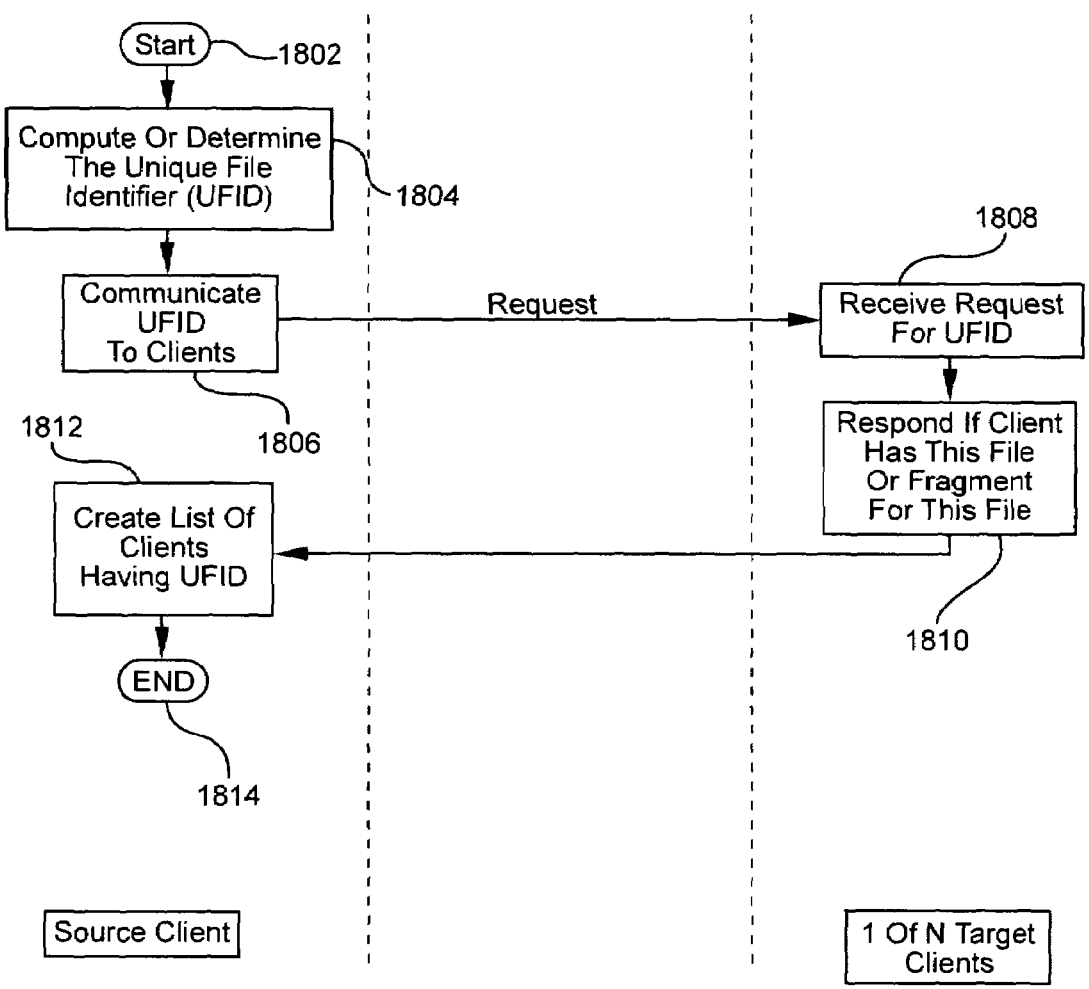
FIG. 18B illustrates a flowchart depicting an alternate method of finding clients for restoring data in a peer-to-peer grid computing system, in accordance with an embodiment of the invention.

Referring to FIGS. 18A and 18B, FIG. 18A depicts a method of seeking clients for restoring a data file using a super node in accordance with an embodiment of the invention, whereas, FIG. 18B depicts an alternate method of seeking clients for restoring a data file without employing a super node. As shown in FIG. 18A, the source client computes or determines in step 1804 the unique file identifier (UFID) for the data file it wants restored and which is stored on one or more target clients. Next, the source client sends the UFID to the super node in step 1806 and the super node receives the UFID from the source client in step 1808 and communicates the request for data file or data file fragments containing the UFID to one or more target clients in step 1810. The request is received by the target clients in step 1812. The target clients that are available and have the data file or data file fragments that contain that specific UFID respond to the super node in step 1814. The super node creates a list, preferably a URL list in step 1816, of available target clients that responded to the request for data file or data file fragment containing the specific UFID and communicates the URL list to the source client in step 1818. The source client receives the URL list from the super node in step 1820, which list is then used by the source client to directly establish communication with one or more of the available target clients on the list. Referring to FIG. 18B, the source client computes or determines in step 1804 the unique file identifier (UFID) for the data file it wants restored and which the source client believes is stored on one or more target clients. Next, the source client communicates, preferably, using a broadcast mechanism, the UFID to one or more target clients in step 1806. The request containing the UFID is received by the target clients in step 1808. The target clients that have data file or data file fragments that contain that specific UFID respond to the source client in step 1810. The source client preferably creates a list in step 1812 of the target client that responded to the request for data file or data file fragment containing the specific UFID. The source client is ready to use the list created to directly establish communication with one or more of the target clients on the list to restore the data file.

Figure 19:
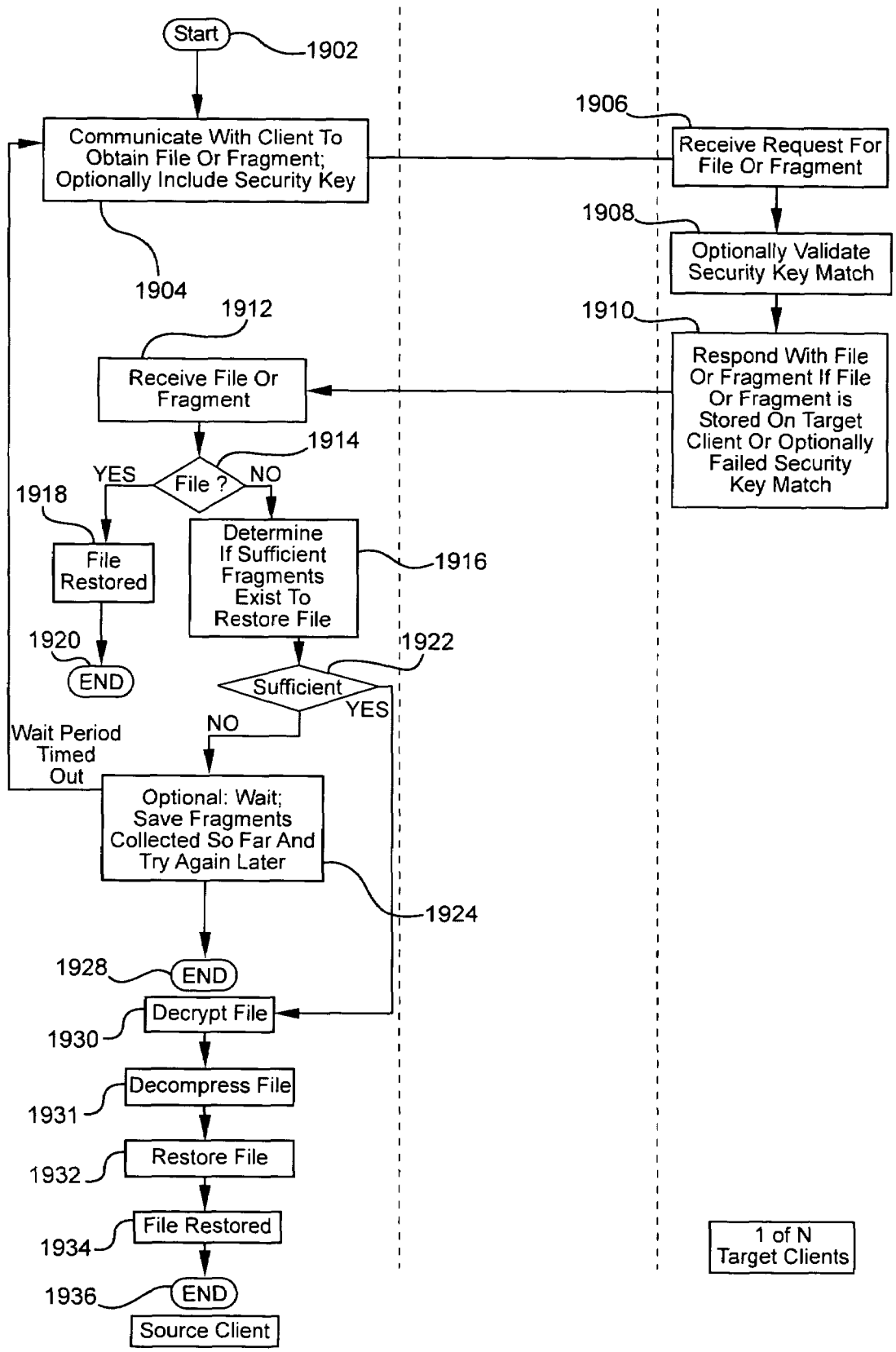
FIG. 19 illustrates a flowchart depicting a method of retrieving a data file or data file fragments from clients across a grid computing system, in accordance with an embodiment of the invention.

FIG. 19 depicts a method of retrieving a data file or data file fragment in order to restore a data file, in accordance with an embodiment of the invention. As described in FIG. 19, the source client communicates with one or more target clients in step 1904 to obtain a data file or data file fragments. The source client preferably provides a unique file identifier (UFID) corresponding to the data file or data file fragments. More preferably, the source client may also provide a security key to the target clients, as explained with reference to FIGS. 12 and 13. The target clients receive the request for the data file or data file fragments in step 1906 and if a security key is provided, the target client validates in step 1908 the security key to determine if the security key provided is a match. If the security key is a match, the target client responds with the data file or data file fragments in step 1910. However, if the security key is not a match, the target client notifies the source client of the failed security key match in step 1910. The source client receives in step 1912 the data file or data file fragments or the notification of the failed security key match. The source client determines in step 1914 if the received data was a file or file fragment. If a file, the file is restored in step 1918 and finished in step 1920. If in step 1914, the source client determines that it is a data file fragment, the source client determines if sufficient data file fragments exist to restore the file in step 1916. If sufficient data file fragments do not exist, then the source client preferably waits for a time period in step 1924. In particular, the source client saves the data file fragments collected so far, and waits for a time period in step 1924 before repeating the process starting with step 1904. However, if the source client determines in step 1922 that sufficient data file fragments exist to restore the data file, the source client decrypts the data file fragments in step 1930, decompresses the file fragments in step 1931, restores the file in step 1932 and marks the file as being restored in step 1934. If the retry loop in step 1924 is exercised to a maximum number of tries, the restoration will end and can be restarted at step 1902 at a later point in time.

Figure 20:
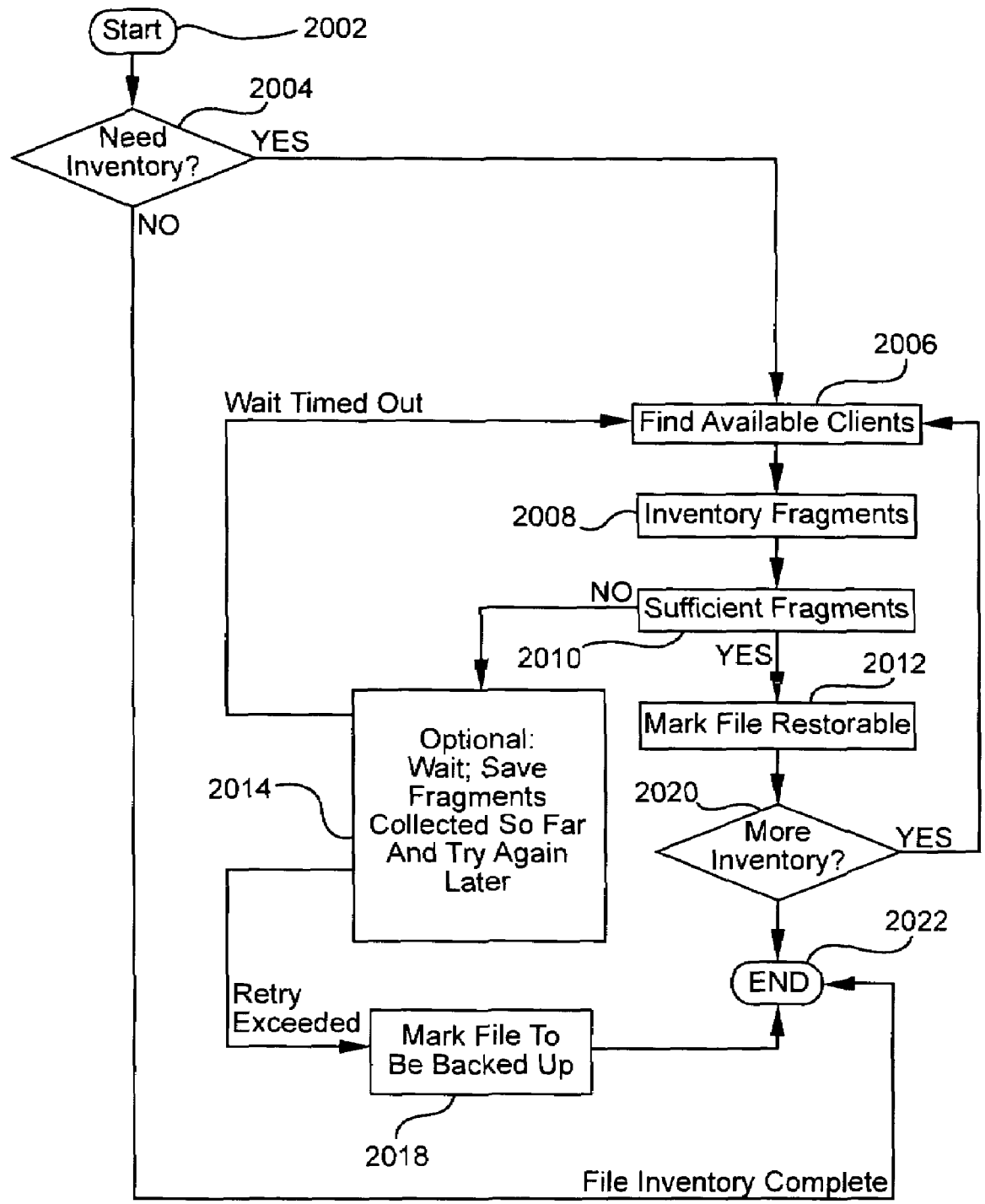
FIG. 20 illustrates a flowchart depicting an inventory process for backing up and restoring data in a peer-to-peer grid computing system, in accordance with an embodiment of the invention.

Referring to FIG. 20, FIG. 20 depicts an overall process wherein the source client conducts an ongoing inventory of data that is backed up and/or restored, in accordance with an embodiment of the invention, in order to deal with situations where target clients that had data file stored at one point are no longer available. The inventory process begins with the source client determining in step 2004 whether an inventory to check if certain data files are still backed up on one or more target clients needs to be conducted. If so, the source client carries out the process of finding available target client in step 2006, as explained in FIGS. 15A, 15B, 18A and 18B. Next, the source client takes an inventory of the fragments in step 2008, and the source client determines if sufficient data file fragments (or files, if a file) have been identified in the inventory process in step 2010. If affirmative, the source client marks the data file as being restorable in step 2012 and the source client determines if it needs to conduct more inventory in step 2020. If the source client determines in step 2020 that it needs to conduct further inventory, the source client repeats the inventory process starting with step 2006. On the other hand, if the source client determines in step 2010 that sufficient data file fragments (or files, if a file) have not been found in the inventory process then, preferably, the source client decides to wait for a timed period in step 2014 before repeating the process starting at step 2006 and the source client saves the data file fragments collected at that point in time for retrying again at a later time. Moreover, if the source client determines the number of retries has exceeded a certain criteria (for instance, a certain time period of weeks or a certain number of tries within a stated time period, etc.), the source client marks the data file to be backed up in step 2018.

Figure 21:
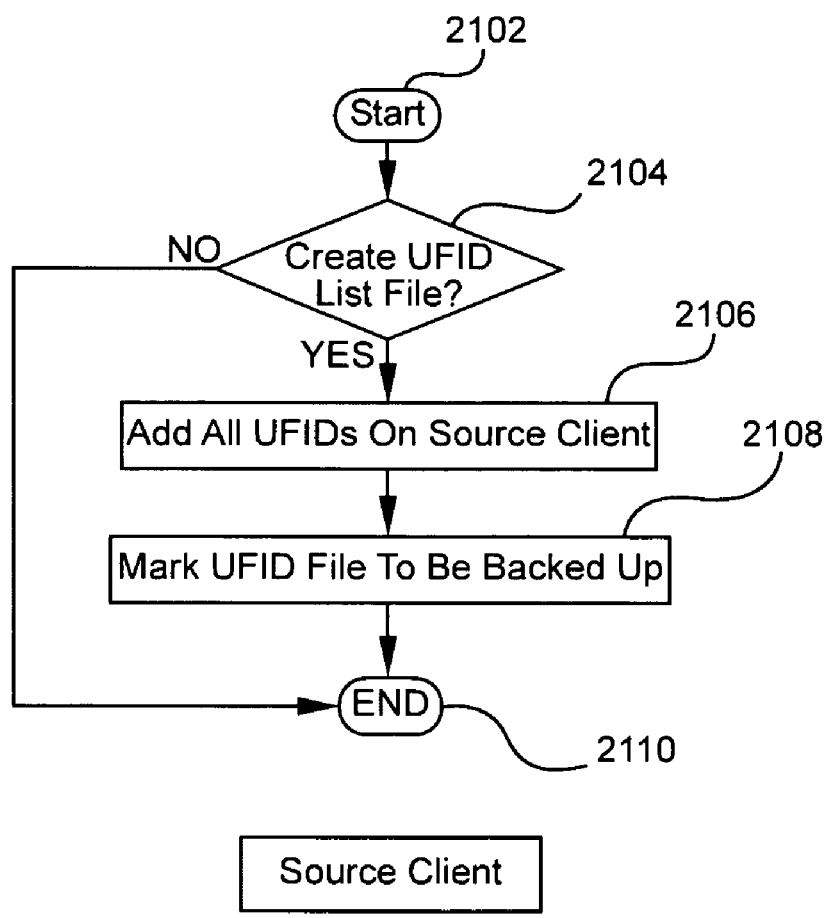
FIG. 21 illustrates a flowchart demonstrating a method of creating a unique file identifier list file for storing all the unique identifiers used by a client, in accordance with an embodiment of the invention.

Furthermore, FIG. 21 outlines a process whereby the source client creates a UFID file list that contains all of the UFIDs utilized by the source client for backing up and restoring data. In general, the source client determines whether to create a UFID list file in step 2104. If yes, the source client creates a UFID file list containing all of the UFIDs stored on the source client in step 2106 and marks the UFID file list to be backed up as any other data file in step 2108. Preferably, the source client keeps a list of all the UFIDs used by the source client. If it does, and if the source client experiences a failure, for instance, loses its hard drive including the UFID list file, then the data files scattered by the source client cannot be retrieved. Thus, the source client puts these UFIDs in a special file the unique file identifier (UFID) list file, which it then backs up like any other file it has. However, the UFID list file can be restored should the entire source client be lost by simply asking for the data file fragments that belong to the UFID list file, which can be identified by information contained in a data file fragment header. Preferably, the UFID list file's UFID is determinable via a secure mechanism.

Furthermore, in yet another embodiment of the invention, the invention provides a programmable media containing programmable software to backup-restore data across a plurality of clients in a grid computing network. The programmable software comprises communicating the trackless data backup-restore request from the source client to the plurality of target clients, establishing connections with a subset of available target clients that respond to the trackless data backup-restore request communicated, and executing the trackless backup-restore request without tracking any location of the data. Preferably, the trackless data backup-restore request comprises one of: backing up one or more data files, backing up one or more of a plurality of data file fragments, restoring one or more data files, retrieving one or more data files, retrieving one or more of a plurality of data file fragments, restoring one or more of a plurality of data files and restoring a client that has experienced a loss of data. In one embodiment, the communicating step further comprises providing a super node list that includes at least one super node configured to broker the trackless data backup-restore request from the source client to the plurality of target clients, such that the super node communicates the trackless data backup-restore request from the source client to the plurality of target clients and provides the source client with a list of the available target clients that responded to the trackless data backup-restore request communicated. Preferably, the establishing step further comprises the source client establishing direct connections with the subset of the available target clients that responded to the trackless data backup-restore request communicated for execution of the trackless data backup-restore request.

In a preferred embodiment, the super node provided in the programmable media comprises a communication module configured to broker the initial communication of the trackless data backup-restore request between the source client and the plurality of target clients. More preferably, the communication module includes a data backup request module that processes a data backup request from a source client to one or more target clients, a data retrieval request module that processes a data retrieval request from a source client to one or more target clients, a data restore request module that processes a data restore request from a source client to one or more target clients and a list generation module that generates a list of all the available target clients that respond to a request from the source client. Furthermore, the source client and the target clients provided in the programmable media each comprises an on demand data backup-restore component that includes a communication module for establishing communication, preferably, either via broadcasting or brokering to the super node, if a super node is used, as well as for establishing peer-to-peer connections with target clients on which to store or to retrieve stored data, a profile management module for facilitating management of a default and unique client profile that is specific to the client, a data storage module for storing, in the storage or memory, backup data received from other peer nodes, a data retrieval module for retrieving backup data from other peer nodes, a data restoration module for restoring backup data retrieved from other peer nodes, a data assembly module for assembling multiple data into a format similar or identical to the original data file, a data compression module for compressing data to be backed up and decompressing data to be restored, a data encryption module for encrypting data to be backed up, a data redundancy module for duplicating, via a redundancy algorithm, data to be backed up, and a unique file identifier generation module for generating a unique file identifier (UFID) for each original data file residing on the client.

Further yet, in another embodiment, each of the plurality of clients provided in the programmable media comprises a local client profile, a global client profile, a data assembly record, and a log. The client profile is configured to store a unique client profile and, in a further embodiment, may store a data unit profile. Preferably, the local client profile of each of the clients provided in the programmable media comprises a client identifier field that is configured to store client identification, such as, a client name or number, a compression parameter that is configured to store default compression parameters, a redundancy parameter that is configured to store default redundancy parameters, an encryption parameter that is configured to store default encryption parameters, a data backup proximity field that is configured to store a default geographical limitation (physical or logical distance), such as, a minimum or maximum distance between the source client and the target client on which backup data can be stored, a data packet proximity field that is configured to store a default physical (miles) or logical (IP address) distance between several target clients on which backup data can be stored, a client storage parameter that is configured to store default client storage allocation parameters, a client processor field that is configured to store processor capability and a client bandwidth field that is configured to store bandwidth capacity.

Moreover, the global client profile is configured to maintain control information about the client and to enable adjusting certain parameters, range of parameters, etc. that effect control information. Preferably, the global client profile of each of the clients provided in the programmable media comprises a network identifier field that is configured to store a network identifier for a particular network system within the grid, a network allocation field that is configured to store a network allocation parameter that indicates the network performance resources (bandwidth, etc.) that are dedicated to the system or this grid system, a client identifier field that is configured to store a client identification parameter, such as a client name or number, a compression parameter that is configured to store the global compression parameters, a redundancy parameter that is configured to store the global redundancy parameters, an encryption parameter that is configured to store the global encryption parameters, client backup proximity field that is configured to store a geographical limitation (physical or logical distance), such as, a minimum or maximum distance between the source client and the target client on which backup data can be stored, client packet proximity field that is configured to store a physical (miles) or logical (IP address) distance between several target clients on which backup data can be stored, a client storage parameter that is configured to store default client storage allocation parameters, client storage parameter that is configured to store a client storage allocation parameter (amount of client storage dedicated to this system or the grid system), a client processor field that is configured to store processor capability and a client bandwidth field that is configured to store bandwidth capacity. In one embodiment, the data assembly record is configured to store information about the order in which several packets of information pertaining to a single backup file should be assembled so that the restored backup file accurately reflects the information stored in the file that was originally backed up. Further, the log, in one embodiment, is configured to store a backup history that logs one or more backup grid application operations over a period of time.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An on-demand data backup-restore system for backing up and restoring data in a grid computing system, said system comprising:
a grid computing system network communications channel; and
a plurality of client nodes connected to said grid computing system network communications channel for said grid computing system, said plurality of client nodes having at least one central processing unit for executing at least one grid application installed thereon, and for executing a trackless data backup-restore software installed on each of said plurality of client nodes for performing an on-demand data backup-restore request, said trackless data backup-restore software providing a respective trackless unique file identifier name to each of one or more data files selected for said on-demand data backup-restore request, at least one of said plurality of client nodes being a source client configured to initiate said on-demand data backup-restore request for either backing up data for said grid application on said grid computing system or for retrieving data stored for said grid application on said grid computing system, one or more of said plurality of client nodes being target clients configured to perform said on-demand data backup-restore request for said grid application on said grid computing system and at least one of said plurality of client nodes being a super node configured to broker an initial communication for said on-demand backup-restore request for said grid application between said source client and said target clients on said grid computing system for backing-up data for said grid application or restoring data for said grid application on said grid computing system, wherein said source client establishes one or more simultaneous sessions with a plurality of available target clients among said target clients, wherein said source client provides to said plurality of available target clients a trackless unique file identifier name corresponding to each of one or more data files selected for said on-demand data backup-restore request, wherein said source client sends one or more data file fragments for a respective data file selected to said plurality of available target clients, and wherein said plurality of available target clients perform said on-demand data backup-restore request using said trackless unique file identifier name provided for said respective data file selected corresponding to each of said one or more data file fragments, and wherein said source client does not track a respective location of said one or more data file fragments backed up on or retrieved from said plurality of available target clients.

2. The system according to claim 1, further comprising:
a subscription manager configured to manage a contractual subscription for each of said plurality of client nodes either backing up data for said grid application on said grid computing system or retrieving data stored for said grid application on said grid computing system.

3. The system according to claim 1, further comprising:
a super node list provider for supplying a super node list that includes said at least one super node configured to broker said initial communication for said on-demand backup-restore request between said source client and said target clients on said grid computing system.

4. The system according to claim 3, wherein said super node on said grid computing system further comprises:
a communication component for communicating said on-demand data backup-restore request received from said source client to said target clients on said grid computing system, wherein said communication component includes a data backup request module for communicating an on-demand data backup request from said source client to said target clients for backing up data, a data retrieval request module for communicating an on-demand data retrieval request from said source client to said target clients for retrieving data, a data restore request module for communicating an on-demand data restore request form said source client to said target clients for restoring data and a list generation module for generating a list of said available target clients among said target clients that are available for performing said on-demand data backup-restore request.

5. The system according to claim 1, wherein each of said plurality of client nodes on said grid computing system further comprises:
a global client profile for storing one or more global parameters for said grid computing system, a local client profile for storing one or more local parameters for a client node of said plurality of client nodes, a data assembly record for storing information pertaining to assembly of a single backup file stored on said grid computing system and a log for storing a backup-restore history of operations performed on said grid computing system over a period of time.

6. The system according to claim 1, wherein each of said plurality of client nodes further comprises:
an on-demand data backup-restore component that includes a communication module for establishing direct connections with said plurality of available target clients for backing up data or for retrieving backup data, a profile management module for managing default and unique client profiles that are specific to each of said plurality of client nodes, a data storage module for storing backup data received from said plurality of client nodes, a data retrieval module for retrieving backup data from said plurality of client nodes, a data restoration module for restoring data in an original data file backed up on said plurality of client nodes, a data assembly module for assembling data into a format similar to said original data file backed up on said plurality of client nodes, a data compression module for compressing data to be backed up on said plurality of client nodes, a data encryption module for encrypting data to be backed up on said plurality of client nodes, a data redundancy module for duplicating data to be backed up on said plurality of client nodes and a unique file identifier generation module for generating a respective trackless unique file identifier name corresponding to each original data file backed up on or retrieved from said plurality of client nodes on said grid computing system.

7. The system according to claim 1, wherein said on-demand data backup-restore request comprises one of: backing up a data file, backing up one or more of a plurality of data file fragments, restoring a data file, retrieving a data file, retrieving one or more of a plurality of data file fragments, restoring one or more of a plurality of data file fragments and restoring a client node of said plurality of client nodes that has experienced a loss of data.

8. A method for trackless backup and restoration of data on-demand across a grid computing system cluster of client nodes, said method comprising the steps of:
- providing said grid computing system cluster of client nodes connected to a grid computing system network communications channel, said grid computing system cluster of client nodes having a grid computing software installed thereon for executing at least one grid application, said grid computing system cluster of client nodes having installed thereon a trackless data backup-restore software for backing up and restoring data, said grid computing system cluster of client nodes including a source client configured to initiate on-demand a trackless data backup-restore request for one or more data file fragments from one or more data files and a plurality of target clients configured to perform on-demand said trackless data backup-restore request for said one or more data file fragments, wherein each of said one or more data file fragments has a respective trackless unique file identifier name;
- seeking a plurality of grid computing system available target clients from said plurality of target clients that are available for performing said trackless data backup-restore request for said one or more data file fragments for said grid application;
- establishing direct connections with a subset of said plurality of grid computing system available target clients that are available for performing said trackless data backup-restore request for said one or more data file fragments corresponding to respective trackless unique file identifier names; and
- directing said trackless data backup-restore request by employing said subset of said plurality of grid computing system available target clients for performing said trackless data backup-restore request for said one or more data file fragments for said grid application; wherein said subset of said plurality of grid computing system available target clients perform said trackless data backup-restore request using said respective trackless unique file identifier name provided corresponding to said one or more data file fragments of a respective data file, and wherein said source client does not track a respective location of said one or more data file fragments backed up on or retrieved from said plurality of grid computing system available target clients.

9. A method according to claim 8, wherein said directing step further comprises the steps of:
- transmitting said trackless data backup-restore request for said one or more data file fragments having said respective trackless unique file identifier names to said subset of said plurality of grid computing system available target clients on said grid computing system; and
- receiving a response to said trackless data backup-restore request from said subset of said plurality of grid computing system available target clients that have said one or more data file fragments corresponding to said respective trackless unique file identifier names transmitted, wherein said source client can determine if sufficient data was backed up or retrieved successfully.

10. A method according to claim 8, wherein said trackless data backup-restore request comprises one of: backing up a data file, backing up one or more of a plurality of data file fragments, restoring a data file, retrieving a data file, retrieving one or more of a plurality of data file fragments, restoring one or more of a plurality of data file fragments and restoring a client node of said cluster of client nodes that has experienced a loss of data.

11. A method according to claim 10, wherein said trackless data backup-restore request is for backing up said one or more data files, and said directing step further comprises the steps of:
- selecting said one or more data files to be backed up by said subset of said grid computing system available target clients on said grid computing system;
- computing a trackless unique file identifier name for said each of said one or more data files selected;
- adding redundancy to said one or more data files selected based on a plurality of profile settings;
- fragmenting into a plurality of data file fragments each of said one or more data files selected to which redundancy has been added;
- encrypting each of said plurality of data file fragments;
- sending each of said plurality of data file fragments to be backed up to said subset of available target clients without tracking any location of where said plurality of data file fragments is sent; and
- severing connections with said subset of said available target clients.

12. A method according to claim 10, wherein said trackless data backup-restore request is for restoring one or more data files, and said directing step further comprises the steps of:
- selecting said one or more data files to be restored on said grid computing system;
- establishing a predefined restoration level to restore said one or more data files selected;
- transmitting said trackless data backup-restore request to said subset of said available target clients along with a respective trackless unique file identifier name corresponding to each of said one or more data files to be restored;
- receiving communication from said subset of said available target clients that possess one or more data file fragments corresponding to said respective trackless unique file identifier name corresponding to each of said one or more data files;
- retrieving said one or more data file fragments from said subset of said available target clients; assembling said one or more data file fragments retrieved from said subset of said available clients to restore said one or more data files; and
- severing connections with said subset of said available target clients.

13. A method according to claim 10, wherein said trackless data backup-restore request is for recreating said client node that has experienced said loss of data, and said directing step further comprises the steps of:
- establishing a predefined restoration level to restore said client node;
- recovering said client node to an initial base state;
- restoring a unique identifier list file containing a list of all of a plurality of trackless unique file identifier names corresponding to all of a plurality of data files that said client node had backed up prior to said loss of data; and
- employing said unique identifier list file to restore all of said plurality of data files that said client node had backed up prior to said loss of data.

14. A method according to claim 10, wherein said providing step further comprises the step of:
- providing said cluster of client nodes that includes at least one super node configured to broker an initial communication regarding said trackless data backup-restore request between said source client and said plurality of target clients on said grid computing system, wherein said at least one super node communicates in said initial communication said respective trackless unique file identifier names corresponding to said one or more data files selected for said trackless backup-restore request, and wherein said at least one super node receives communication from said subset of said available target clients that possess said one or more data file fragments corresponding to said respective trackless unique file identifier names communicated.

15. A method according to claim 12, further comprising the steps of:
determining whether a sufficient number of said one or more data file fragments have been retrieved from said subset of said available target clients to restore each of said one or more data files selected to said predefined restoration level; and
if said sufficient number of said data file fragments have not been retrieved, initiating another data backup-restore request for acquiring additional data file fragments to restore each of said one or more data files selected to said predefined restoration level.

16. A method according to claim 13, wherein said employing step further comprises the steps of:
transmitting said trackless data backup-restore request to said subset of said available target clients along with said respective trackless unique file identifier names corresponding to said plurality of data files to be restored;
receiving communication from said subset of said available target clients that possess one or more data file fragments corresponding to said respective trackless unique file identifier names transmitted to restore said plurality of data files that said client had backed up prior to said loss of data;
retrieving said one or more data file fragments corresponding to said respective trackless unique file identifier names;
assembling each of said plurality of data files from said one or more data file fragments retrieved from said subset of said available target clients; and
severing connections with said subset of said available target clients.

17. A method according to claim 14, wherein said seeking step further comprises the steps of:
said at least one super node communicating said trackless data backup-restore request from said source client to said plurality of target clients and said at least one super node receiving communication from said available target clients regarding availability; and
said at least one super node supplying said source client with a list of said available target clients that are available for performing said trackless data backup-restore request.

18. A method of providing a trackless data backup-restoration service for backing up and restoring data on-demand across a plurality of peer nodes in a grid computing system, said method comprising the steps of:
providing said plurality of grid computing system peer nodes connected via a grid computing system network communications channel for said grid computing system, said plurality of grid computing system peer nodes having a grid computing software installed thereon for executing at least one grid application, said plurality of grid computing system peer nodes including a grid computing system source client configured to initiate a trackless data backup-restore request on-demand for one or more data files having one or more data file fragments, said one or more data files having respective trackless unique file identifier names, and a plurality of grid computing system target clients configured to perform said trackless data backup-restore request on-demand for said one or more data files having said respective trackless unique file identifier names;
supplying a trackless data backup-restore software to said plurality of grid computing system peer nodes for installation on said plurality of grid computing system peer nodes, said trackless data backup-restore software including a grid computing system super node list containing at least one grid computing system super node configured to broker said trackless data backup-restore request from said grid computing system source client to said plurality of grid computing system target clients;
communicating said trackless data backup-restore request, including said respective trackless unique file identifier names corresponding to said one or more data files, from said grid computing system source client to a respective grid computing system super node on said grid computing system super node list;
transmitting, by said respective grid computing system super node, said data backup-restore request from said source client to said plurality of target clients;
said respective grid computing system super node forwarding to said source client a grid computing system target list of available target clients that are available to perform said trackless data backup-restore request on-demand; and
establishing, by said source client, direct connections with said available target clients on said grid computing system target list for performing said trackless data backup-restore request on-demand, wherein said available target clients perform said trackless data backup-restore request for said one or more data file fragments on said grid computing system, without tracking a respective location of said one or more data file fragments backed up on or retrieved from said grid computing system.

19. A method according to claim 18, wherein said providing step further comprises the step of:
providing a subscription manager for registering said plurality of grid computing system peer nodes for participation in said trackless data backup-restoration service.

20. Programmable media storing programmable software to backup-restore data across a plurality of grid computing network peer nodes in a grid computing network, said plurality of grid computing network peer nodes having a grid computing software installed thereon for executing a grid application, said plurality of grid computing network peer nodes having installed thereon a trackless data backup-restore software for backing up and restoring data, said plurality of grid computing network peer nodes including a source client configured to initiate on-demand a trackless data backup-restore request for one or more data files fragmented into one or more data file fragments and a plurality of target clients configured to perform on-demand said trackless data backup-restore request for said one or more data file fragments, said programmable software comprising the steps of:
communicating said trackless data backup-restore request from said source client to said plurality of target clients, said trackless data backup-restore request including respective trackless unique file identifier names corresponding to said one or more data files;
establishing direct connections between said source client and a subset of available target clients that respond to said trackless data backup-restore request communicated; and
executing said trackless backup-restore request containing said respective trackless unique file identifier names corresponding to said one or more data files on said subset of available target clients without tracking respective locations of said data file fragments backed up on or retrieved from said subset of available target clients.

21. The programmable media according to claim 20, wherein said trackless data backup-restore request comprises one of: backing up a data file, backing up one or more of a plurality of data file fragments, restoring a data file, retrieving a data file, retrieving one or more of a plurality of data file fragments, restoring one or more of a plurality of data file fragments and restoring a peer node of said plurality of peer nodes that has experienced a loss of data.

22. The programmable media according to claim 21, wherein said communicating step further comprises the step of:

provling a super node list that includes at least one super node configured to broker said trackless data backup-restore request on-demand from said source client to said plurality of target clients on said grid computing system, wherein said super node communicates said trackless data backup-restore request containing said respective trackless unique file identifier names corresponding to said one or more data files selected for said trackless data backup-restore request from said source client to said plurality of target clients and provides said source client with a list of said available target clients that responded to said trackless data backup-restore request communicated, and wherein said source client establishes direct connections with a subset of said available target clients for performing on-demand said trackless backup-restore request.

* * * * *

UNITED STATES PATENT AND TRADEMARK OFFICE
CERTIFICATE OF CORRECTION

PATENT NO.       : 7,584,226 B2  
APPLICATION NO. : 11/135876  
DATED            : September 1, 2009  
INVENTOR(S)      : Fatula, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Fourteenth Day of September, 2010

David J. Kappos  
*Director of the United States Patent and Trademark Office*